United States Patent
Danziger et al.

(10) Patent No.: US 11,882,262 B2
(45) Date of Patent: Jan. 23, 2024

(54) SYSTEM AND METHOD FOR STEREOSCOPIC IMAGE ANALYSIS

(71) Applicant: FORESIGHT AUTOMOTIVE LTD., Ness Ziona (IL)

(72) Inventors: Omri Danziger, Kfar Vradim (IL); Ron Katzir, Be'er Ya'akov (IL); Ivgeny Kopilevich, Rehovot (IL); Eliav Elul, Sde Tzvi (IL)

(73) Assignee: FORESIGHT AUTOMOTIVE LTD., Ness Ziona (IL)

( * ) Notice: Subject to any disclaimer, the term of this patent is extended or adjusted under 35 U.S.C. 154(b) by 0 days.

(21) Appl. No.: 17/982,691

(22) Filed: Nov. 8, 2022

(65) Prior Publication Data

US 2023/0141515 A1    May 11, 2023

Related U.S. Application Data

(60) Provisional application No. 63/276,800, filed on Nov. 8, 2021.

(51) Int. Cl.
*H04N 13/246* (2018.01)
*G06T 7/285* (2017.01)
(Continued)

(52) U.S. Cl.
CPC ........... *H04N 13/246* (2018.05); *G06T 7/285* (2017.01); *G06T 7/85* (2017.01); *G06V 10/751* (2022.01);
(Continued)

(58) Field of Classification Search
CPC ......... H04N 13/246; H04N 2013/0081; H04N 13/239; H04N 13/296; G06T 7/285;
(Continued)

(56) References Cited

U.S. PATENT DOCUMENTS

2013/0271578 A1\* 10/2013 Richards ................. G06T 5/006
348/47
2014/0320607 A1   10/2014 Hamann et al.
(Continued)

OTHER PUBLICATIONS

Larson, Joshua D., "Stereo Camera Calibrations with Optical Flow" (2021). Theses and Dissertations. 4903. https://scholar.afit.edu/etd/4903.

*Primary Examiner* — Susan E. Torgerson
(74) *Attorney, Agent, or Firm* — The Roy Gross Law Firm, LLC; Roy Gross

(57) ABSTRACT

A system and method of stereoscopic image processing by at least one processor may include receiving, from a first imaging device, having a first field of view (FOV), and located at a first, initially unknown position, a first image of a scene; receiving, from a second imaging device, having a second, different FOV, and located at a second, initially unknown position, a second image of the scene; calculating a plurality of flow lines in the first image, wherein each flow line represents an optical flow between a pixel of the first image and a corresponding pixel of the second image; and calibrating the imaging devices by determining at least one parameter of relative position between the first imaging device and second imaging device, based on the calculated flow lines.

19 Claims, 14 Drawing Sheets

(51) Int. Cl.
    *G06T 7/80*         (2017.01)
    *G06V 10/75*       (2022.01)
    *G06V 20/58*       (2022.01)
    *B60W 50/14*      (2020.01)

(52) U.S. Cl.
    CPC ............. *G06V 20/58* (2022.01); *B60W 50/14* (2013.01); *G06T 2207/10012* (2013.01); *G06T 2207/20084* (2013.01); *G06T 2207/30244* (2013.01)

(58) Field of Classification Search
    CPC ............. G06T 7/85; G06T 2207/10012; G06T 2207/20084; G06T 2207/30244; G06T 7/593; G06V 10/751; G06V 20/58; B60W 50/14
    USPC .......................................................... 348/47
    See application file for complete search history.

(56) References Cited

U.S. PATENT DOCUMENTS

| | | | |
|---|---|---|---|
| 2017/0277197 A1* | 9/2017 | Liao | ........................... G06T 7/20 |
| 2018/0070074 A1 | 3/2018 | Nobori et al. | |
| 2020/0342652 A1 | 10/2020 | Rowell et al. | |
| 2021/0004969 A1 | 1/2021 | Pourian et al. | |
| 2021/0065379 A1* | 3/2021 | Zhang | ..................... G06T 5/002 |

\* cited by examiner

SYSTEM AND METHOD FOR STEREOSCOPIC IMAGE ANALYSIS

CROSS-REFERENCE TO RELATED APPLICATIONS

This application claims the benefit of priority of U.S. Patent Application No. 63/276,800, filed Nov. 8, 2021, and entitled "SYSTEM AND METHOD FOR STEREOSCOPIC IMAGE ANALYSIS", which is hereby incorporated by reference in its entirety.

FIELD OF THE INVENTION

The present invention relates generally to stereoscopic image analysis. More specifically, the present invention relates to calibration of imaging devices, matching of elements depicted in stereoscopic imaging systems, and 3D reconstruction

BACKGROUND OF THE INVENTION

Classical stereoscopic vision systems are commonly implemented with similar imaging devices, situated on a same imaging plane, e.g., identical cameras having identical sensors, and translation being horizontal in the sensor image axes. Implementation of such stereoscopic systems may ensure relatively simple mathematical complexity for object matching process, disparity map extraction. Such implementations are common in security and surveillance systems, where the cameras and poles are fixed and static. However, in recent years, the use of cameras have been widespread, and a vast variety of cameras are in use on a daily basis in a large range of applications and systems that requires diversity of imaging devices. For example, in advanced driver-assistance systems (ADAS) vast variety of cameras and sensors may be used, each may have different characteristics and in addition, each camera may be located in a variety of selected location according to the specific vehicle considerations, e.g., inside or outside the vehicle. In such systems, the single imaging plane constraint may complicate system installation on one hand and on the other hand, disregarding it may lead to very high computational load during image analysis and reduce the mutual field of view.

SUMMARY OF THE INVENTION

It is an object of the present application to provide a hybrid stereoscopic system based on multiple, identical and/or non-identical cameras located at initially unknown locations for improving detection capabilities while reducing computational cost.

Embodiments of the invention may include a method for image analysis by at least one processor, as elaborated herein. According to some embodiments, the at least one processor may be configured to receive, from a first imaging device located at a first position, a first image of a scene, having a first field of view (FOV), and receive, from a second imaging device located at a second position, a second image of the scene, having a second FOV.

The at least one processor may calibrate the first imaging device and the second imaging device by identifying an optical flow between the first image and the second image, applying an epipolar geometric constraint on the optical flow to find a plurality of epipolar lines, determining the first position for the first imaging device and the second position for the second imaging such that the plurality of epipolar lines converge to an origin point. The at least one processor may subsequently match at least one pixel in the first image with at least one corresponding pixel in the second image by searching the corresponding pixel on an epipolar line from the plurality of epipolar lines, where the pixel in the first image and the corresponding pixel in the second image correspond to a point in a three dimensional (3D) representation of the scene.

According to some embodiments, the at least one processor may determine one or more coordinates of the point in the 3D representation of the scene based on the position of the pixel in the first image and the position of the corresponding pixel in the second image.

The at least one processor may use the one or more coordinates of the point in the 3D representation of the scene for depth estimation of the point in the scene. The at least one processor may search the corresponding pixel on an epipolar line from the plurality of epipolar lines, to reduce a search area in the second image.

According to some embodiments, the at least one processor may identify an optical flow between the first image and the second image by mapping a position of a pixel in the first image to a corresponding position of the pixel in the second image.

Embodiments of the invention may include applying the epipolar geometric constraint on the optical flow by using convolutional neural networks (CNN) methods.

Embodiments of the invention may include calibrating the first imaging device and the second imaging device by determining calibration parameters for the first imaging device and for the second imaging device based on the optical flow and the epipolar geometric constraint.

Embodiments of the invention may include calibrating the first imaging device and the second imaging device by synchronizing the first imaging device to the second imaging device.

Embodiments of the invention may include matching an object in the first image with a corresponding object in the second image by searching the corresponding object on an epipolar line from the plurality of epipolar lines.

According to embodiments of the invention, the first image of the scene may be taken, by the first imaging device, from a first point of view and the second image of the scene may be taken, by the second imaging device, from a second point of view.

Embodiments of the invention may include a system for image analysis. The system may include a memory and a processor configured to receive, from a first imaging device located at a first position, a first image of a scene, wherein the first imaging device having a first FOV and receive, from a second imaging device located at a second position, a second image of the scene, wherein the second imaging device having a second FOV.

According to embodiments of the invention, the processor may be further configured to calibrate the first imaging device and the second imaging device by identifying an optical flow between the first image and the second image, applying an epipolar geometric constraint on the optical flow to find a plurality of epipolar lines and determining the first position for the first imaging device and the second position for the second imaging such that the plurality of epipolar lines converge to an origin point. The processor may be further configured to match a pixel in the first image with a corresponding pixel in the second image by searching the corresponding pixel on an epipolar line from the plurality of epipolar lines, wherein the pixel in the first image and the corresponding pixel in the second image correspond to a point in a three-dimensional (3D) representation of the scene.

According to embodiments of the invention, the processor may be further configured to determine one or more coordinates of the point in the 3D representation of the scene based on the position of the pixel in the first image and the position of the corresponding pixel in the second image.

According to embodiments of the invention, the processor may be further configured to calibrate the first imaging device and the second imaging device by determining calibration parameters for the first imaging device and for the second imaging device based on the optical flow and the epipolar geometric constraint.

According to embodiments of the invention, the processor may be further configured to calibrate the first imaging device and the second imaging device by synchronizing the first imaging device to the second imaging device.

According to embodiments of the invention, the processor may be further configured to match an object in the first image with a corresponding object in the second image by searching the corresponding object on an epipolar line from the plurality of epipolar lines.

Additionally, or alternatively, embodiments of the invention may include a method of stereoscopic image processing by at least one processor. According to some embodiments, the at least one processor may receive, from a first imaging device, having a first FOV, and located at a first, initially unknown position, a first image of a scene; receiving, from a second imaging device, having a second, different FOV, and located at a second, initially unknown position, a second image of the scene. The at least one processor may calculate a plurality of flow lines in a plane of the first image, wherein each flow line represents an optical flow between a pixel of the first image and a corresponding pixel of the second image. The at least one processor may calibrate the imaging devices by determining at least one an intrinsic camera parameter, and/or parameter of relative position between the first imaging device and second imaging device, based on the calculated flow lines.

According to some embodiments, calibrating the imaging devices may include an iterative calibration process, that may include one or more (e.g., a plurality of) iterations.

Each iteration of the calibration process may include, for example calculating the flow lines, based on (a) location of the pixels in the first image and location of the corresponding pixels in the second image, and (b) at least one parameter of relative position between the first imaging device and second imaging device; and adjusting the at least one parameter of relative position, such that the flow lines may intersect at a region of convergence in a plane of the first image. The at least one processor may continue the iterative calibration process until the region of convergence may be confined to a minimal radius around a predetermined location in a plane the first image.

Additionally, or alternatively, each iteration further may include calculating a convergence error value, representing distance of at least one flow line from the region of convergence. The at least one processor may adjust the at least one intrinsic camera parameter and/or the at least one parameter of relative position by calculating a value of the intrinsic camera parameter and/or parameter of relative position so as to minimize the convergence error value.

According to some embodiments, each pair of consecutive iterations may include (i) a first iteration, which that includes adjustment of at least one parameter of relative position and/or intrinsic camera parameter, and (ii) a second iteration, which may include adjustment of at least one other parameter of relative position and/or intrinsic camera parameter.

The parameter of relative position may include, for example a translation between the first imaging device and second imaging device, and/or a difference in orientation between the first imaging device and second imaging device.

According to embodiments of the invention, the at least one processor may triangulate between one or more pixels depicted in the first image and one or more corresponding pixels depicted in the second image, based on (a) location of the one or more pixels in the first image, (b) location of the one or more corresponding pixels in the second image, and (c) the at least one determined parameter of relative position. The at least one processor may subsequently obtain 3D coordinates of one or more respective points in the scene, based on said triangulation.

Additionally, or alternatively, the at least one processor may produce a 3D representation of the scene based on the 3D coordinates of the one or more points in the scene.

According to embodiments of the invention, the at least one processor may analyze at least one of the first image and the second image to produce, based on the plurality of flow lines, a respective plurality of epipolar lines having a common origin point. The common origin point may correspond to the region of convergence in the first image.

This analysis may include, for example, applying an image rectification function on the first image and on the second image, to produce respective first rectified image and second rectified image, wherein the rectified images may be characterized by having a minimal level of image distortion, thereby aligning the flow lines of the first image into straight, epipolar lines that intersect at the common origin point in a plane of the first rectified image. Each epipolar line may represent an optical flow between a pixel of the first rectified image and a corresponding pixel of the second rectified image.

Additionally, or alternatively, the at least one processor may select a first pixel in the first rectified image; identify an epipolar line that connects the first pixel with the common origin point in the first rectified image; identify a subset of pixels in the second rectified image that pertain to a location defined by the determined epipolar line in the first rectified image; and selecting a second pixel among the subset of pixels as matching the first pixel of the first rectified image, based on a predetermined similarity metric.

In other words, the at least one processor may match one or more pixels in the first rectified image with one or more corresponding pixels in the second rectified image, by searching the one or more corresponding pixels along an epipolar line of the plurality of epipolar lines.

Additionally, or alternatively, the at least one processor may apply an object-detection algorithm on the first rectified image to identify an object depicted in the first image; and match the detected object in the first image with a corresponding object in the second rectified image by searching the corresponding object along an epipolar line of the plurality of epipolar lines.

According to some embodiments, the calibration of imaging devices may be performed repeatedly over time. At each repetition, the first imaging device and the second imaging device may be synchronized, so as to produce respective images of the scene substantially at the same time.

According to some embodiments, the at least one processor may calculate a flow line by applying a machine-learning (ML) model on the first image and the second image, to map between a position of a first pixel in the first image and a position of the corresponding pixel in the second image.

According to some embodiments, the at least one processor may produce at least one notification (170C, FIGS. 3B, 3C) pertaining to the 3D coordinates of the one or more points in the scene; and transmit that notification (170C, FIGS. 3B, 3C) to at least one processor of an Advanced Driver Assisting Systems (ADAS) in a vehicle. The ADAS processor may, in turn, be configured to display said notification in a user interface (UI) of the ADAS.

Additionally, or alternatively, the at least one processor may transmit the notification (170C, FIGS. 3B, 3C) to at least one controller (210, FIGS. 3B, 3C) of a vehicle, configured to control one or more motors or actuators of the vehicle, so as to conduct the vehicle based on the notification (170C, FIGS. 3B, 3C).

Embodiments of the invention may include a method for image analysis by at least one processor. Embodiments of the method may include receiving, from a first imaging device, having a first FOV, and located at a first, initially unknown position, a first image of a scene; receiving, from a second imaging device, having a second, different FOV, and located at a second, initially unknown position, a second image of the scene; calibrating at least one of the first imaging device and second imaging device, to obtain an origin point in a plane of the first image, said origin point defining convergence of a plurality of epipolar lines, each representing an optical flow between the first image and the second image; and matching one or more pixels in the first image with one or more corresponding pixels in the second image by searching the one or more corresponding pixels along an epipolar line of the plurality of epipolar lines.

Embodiments of the invention may include a system for calibrating imaging devices. Embodiments of the system may include a first imaging device, having a first FOV, and located at a first, initially unknown position; a second imaging device, having a second, different FOV, and located at a second, initially unknown position; a non-transitory memory device, wherein modules of instruction code may be stored, and at least one processor associated with the memory device, and configured to execute the modules of instruction code.

Upon execution of the modules of instruction code, the at least one processor may be configured to: receive a first image of a scene from the first imaging device, and receive a second image of the scene from the second imaging device; calculate a plurality of flow lines in the first image, wherein each flow line represents an optical flow between a pixel of the first image and a corresponding pixel of the second image; and calibrate the imaging devices by determining at least one parameter of relative position between the first imaging device and second imaging device, based on the calculated flow lines.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A depicts an image captured by a first camera of the system, FIG. 4B depicts an image captured by a second camera of the system, FIG. 4C is an illustrative depiction of an optical flow, between the images depicted in FIG. 4A and FIG. 4B, FIG. 4D depicts a ground-truth 3D representation of the captured scene, FIG. 4E depicts a calculated 3D representation that may be generated according to embodiments of the invention, and FIG. 4F depicts an exemplary setup of cameras of the system on a platform such as a car or vehicle;

Figure 1:
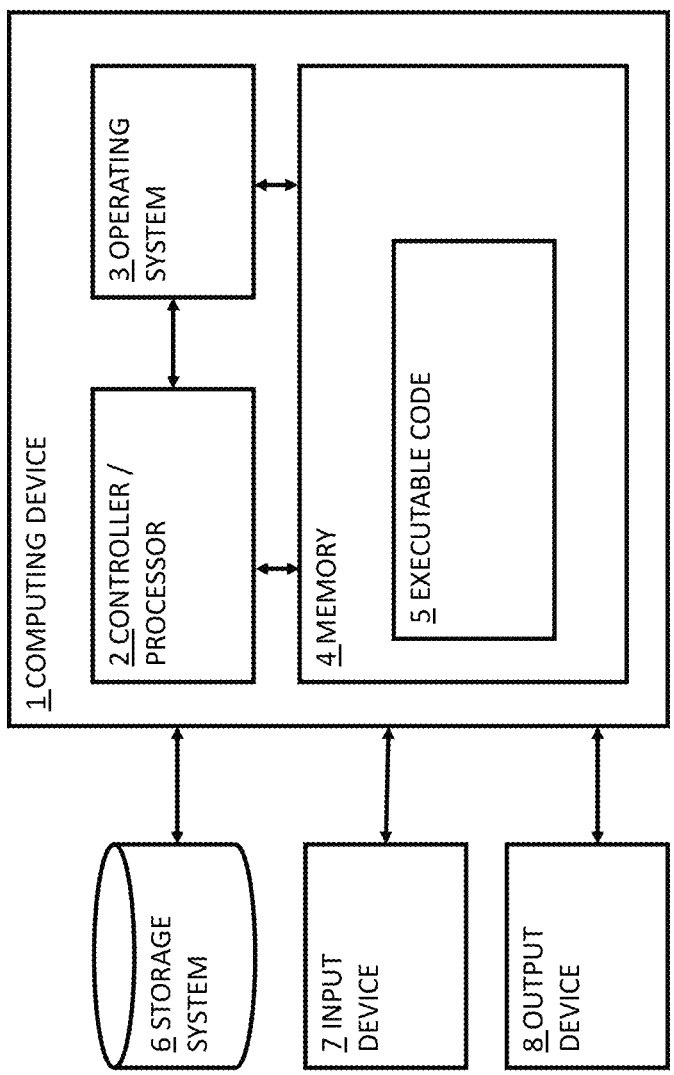
FIG. 1 is a block diagram, depicting a computing device which may be included in a system for stereoscopic image processing according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for image analysis, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may perform image analysis as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more images may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

The term neural network (NN) or artificial neural network (ANN), e.g., a neural network implementing a machine learning (ML) or artificial intelligence (AI) function, may be used herein to refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. At least one processor (e.g., processor 2 of FIG. 1) such as one or more CPUs or graphics processing units (GPUs), or a dedicated hardware device may perform the relevant calculations.

Figure 2:
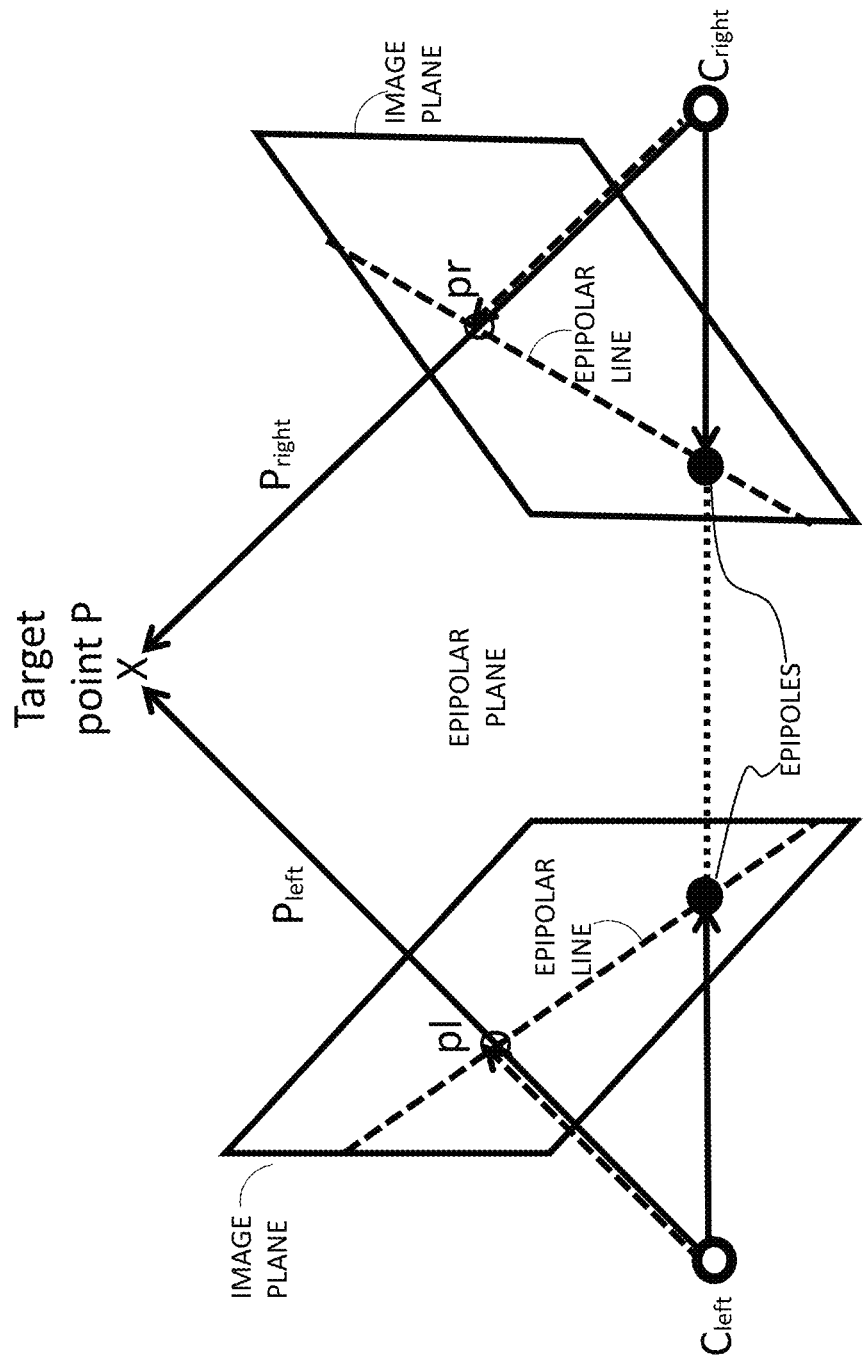
FIG. 2 is a schematic diagram depicting terms and principles of epipolar geometry, in a constellation of two cameras, as known in the art.

Reference is now made to FIG. 2, which is a schematic diagram depicting terms and principles of epipolar geometry, in a constellation of two cameras, as known in the art. In the example of FIG. 2, points Cleft and Cright represent projection centers of a left camera and a right camera of the camera constellation, respectively. The projection center of each camera may be understood as identifying an origin of a three dimensional (3D) reference frame of that camera.

The vectors Pleft and Pright may represent a line of sight that connects each camera's projection center with a point of interest or target P in the depicted 3D space, and are projected onto the cameras' image planes at points pl and pr respectively.

As shown in the example of FIG. 2, points P, Cleft and Cright define a plane that is herein referred to as an "epipolar plane". The intersection of this epipolar plane with each camera's image plane defines a respective line, which is referred to herein as an epipolar line.

The epipolar lines are characterized as the geometric locations along which a point in the 3D space (e.g., point P), that is depicted in a first image plane (e.g., at location pl) and may be expected to be found in the complementary image plane (e.g., at location pr). This mapping between points in the left image and lines in the right image (and vice versa) may be referred to herein as an "epipolar constraint".

The points at which the line that connects the centers of projection (Cleft, Cright) intersects the image planes are called epipoles.

In the example of FIG. 2, it is assumed that the location or position of each camera (or at least the relative location between the two cameras) is well known. In such a constellation, since all lines of sight (e.g., Pleft) include the projection center (e.g., Cleft), then all epipolar lines of each camera converge onto that camera's epipole.

Embodiments of the invention may be configured to receive images that originate from imaging devices or cameras of which the relative location or position of the centers of projection is initially unknown. Additionally, or alternatively, imaging devices or cameras of the present invention may have different intrinsic parameters 120B such as different focal lengths, fields of view (FOV), and image distortion. In other words, embodiments of the invention may operate in conditions where the epipolar constraint may not be initially exploited, or applied directly to raw images acquired from the imaging devices, to predict a location of a target in a first image plane, given its projection on the complementary image plain.

As elaborated herein, embodiments of the invention may calculate a plurality of flow lines in a plane of the first image 20A'. Each flow line may represent an optical flow between a pixel of a first image, acquired from a first camera, and a corresponding pixel of a second image, acquired from a second camera. Embodiments of the invention may then perform a process of calibration of at least one camera, based on the flow lines, to determine position parameters of the at least one camera (or the relative location between the two cameras), thereby determining epipoles of the participating imaging devices. Embodiments of the invention may subsequently utilize the epipolar constraints as explained in relation to FIG. 2, to predict a location of a target in a first image plane, given its projection on the complementary image plain.

Figure 3A:
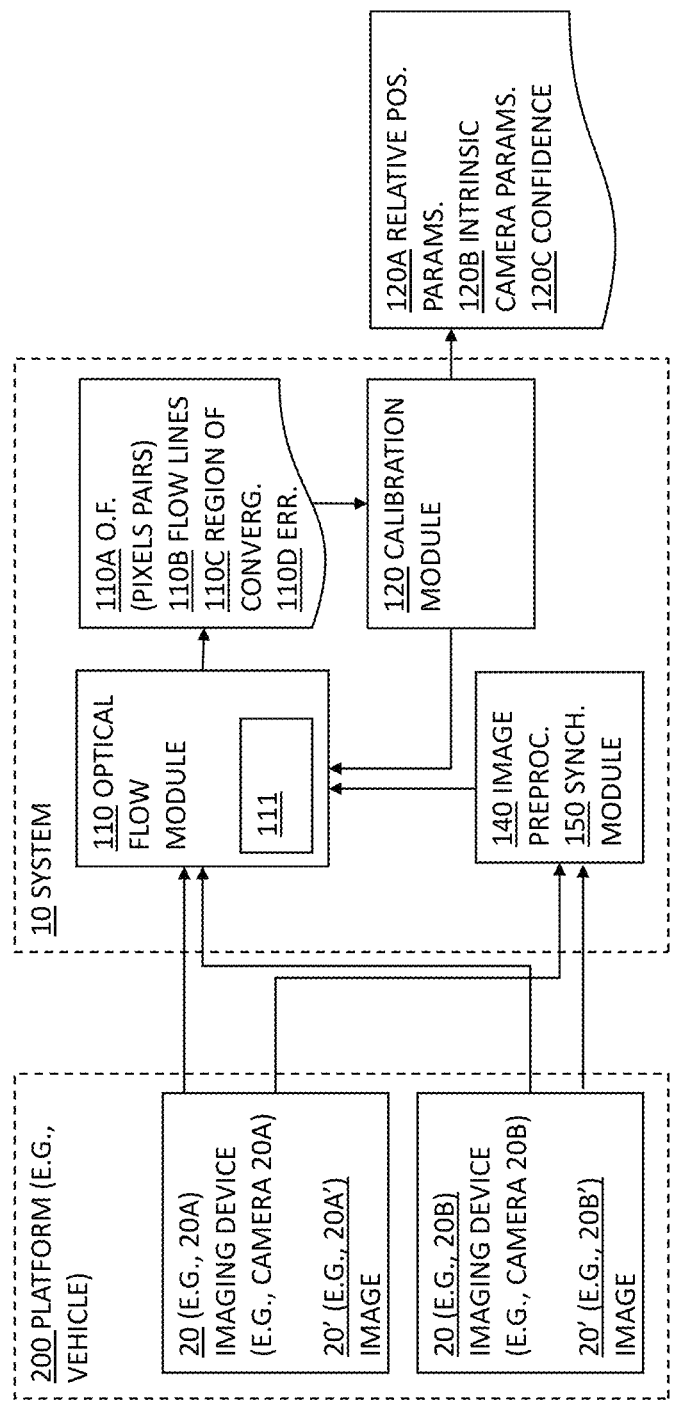
FIGS. 3A, 3B and 3C are block diagrams depicting exemplary aspects of a system for stereoscopic image analysis, according to some embodiments of the invention.

Reference is now made to FIG. 3A, which is a block diagram depicting a system 10 for stereoscopic image analysis, according to some embodiments of the invention.

According to some embodiments of the invention, system 10 may be implemented as a software module, a hardware module, or any combination thereof. For example, system 10 may be, or may include a computing device such as element 1 of FIG. 1, and may be adapted to execute one or more modules of executable code (e.g., element 5 of FIG. 1) to implement methods of stereoscopic image analysis, as further described herein.

As shown in FIG. 3A, arrows may represent flow of one or more data elements to and from system 10 and/or among modules or elements of system 10. Some arrows have been omitted in FIG. 3 for the purpose of clarity.

According to some embodiments, system 10 may be configured to implement methods that improve performance of stereoscopic vision algorithms in relation to currently available systems of stereoscopic image analysis.

For example, and as known in the art, currently available systems of stereoscopic image analysis are typically implemented using identical cameras, identical sensors, sensors with parallel focal planes, cameras having fixed and static poles and the like. In contrast, embodiments of the invention may facilitate stereoscopic image analysis while using imaging devices that have different, or even undetermined optical characteristics and positioning settings, and may be utilized in applications which require or include mobility or movements of the participating cameras.

For example, system 10 may facilitate stereoscopic image analysis in applications that require installation of various types of cameras inside or around a common platform 200, such as a vehicle, e.g., for facilitating Advanced Driver Assisting Systems (ADAS) functionality, for controlling autonomous driving vehicles, and/or other implementations in which a parallelism constraint on cameras installation may complicate the installation and/or restrict it. In such implementations it may be desirable to fix the two or more cameras in selected points, e.g., inside and/or outside a vehicle, not do not necessarily align the imaging devices in parallel image planes.

As shown in the example of FIG. 3A, system 10 may be a hybrid stereoscopic system, in the sense that it may be associated with, or may be communicatively connected to at least two different imaging devices, cameras or sensors 20 (denoted 20A and 20B). Additionally, or alternatively, system 10 may include the at least two cameras or sensors 20. Imaging devices 20A and 20B may have different optical characteristics. For example, cameras 20 may be integrated with day sensors, IR sensors, bolometric sensors, short-wave infrared (SWIR) sensors, near infrared (NIR) sensors or any other combination of different cameras and/or sensors. In this context, the terms "imaging device", "camera" and "sensor" may be used herein interchangeably.

According to some embodiments of the invention, multiple cameras 20 may be located without constraints. In other words, the exact pose, location, orientation, etc. of each camera 20A, 20B (and/or the relative pose, location, orientation, etc. between cameras 20) may initially be undetermined, such that reduction of mathematical complexity in various processes such as calibration, synchronization, disparity estimation, common FOV and depth estimation may not be available.

As elaborated herein, system 10 may include a practical application of calibrating between the at least two imaging devices 20, to reduce computational complexity, and thus provide an improvement in technology of stereoscopic imaging systems. In some embodiments, system 10 may perform a calibration process based on optical flow between images 20' (e.g., 20A' and 20B') originating from cameras 20 (e.g., from cameras 20A and 20B respectively), instead of applying currently available methods of calibration, which typically consume heavier computational resources, such as time, memory, processing cycles and electrical power.

Additionally, or alternatively, and as elaborated herein, system 10 may utilize the calibration between cameras 20, and apply epipolar geometry during a matching process, to match between a point, pixel or object in a first image 20A' of first camera 20A and a corresponding point, pixel or object in an image 20B' of second camera 20B.

As shown in the example of FIG. 3A, system 10 may include a synchronization module 150. Synchronization module 150 may be configured to ensure synchronization between the plurality of cameras 20 that are positioned such as to capture or analyze concurrent images 20A', 20B' of the same scene.

For example, synchronization module 150 may enforce synchronization between two cameras 20 (e.g., 20A and 20B) mounted on a single vehicle. The synchronization process may allow accurate detection and matching of objects in the FOV of cameras 20. In embodiments where moving objects are detected (e.g., moving in relation to cameras 20), a synchronization between the multiple of cameras may be required. Synchronization module 150 may ensure that the two or more imaging devices 20 may operate at the same times and/or at the same rate. Additionally, or alternatively, synchronization module 150 may ensure that system 10 may use substantially concurrent images 20A', 20B' to implement the processes of stereoscopic image analyses, as elaborated herein. For example, synchronization module 150 may ensure that each of the plurality of cameras 20 may capture images at certain times and at a predetermined capturing rate. Synchronization module 150 may perform mutual synchronization by dedicated hardware and/or software. Additionally or alternatively, a timestamp may be attached to each of the frames or images 20' by each of cameras 20, to allow post collection synchronization.

As elaborated herein, imaging devices or cameras (e.g., 20A, 20B) may be installed, placed, or fixed to any desired positions (e.g., on a rear side and a front side of a car). Therefore, as shown in FIG. 3A, system 10 may include an image preprocessing module 140, configured to perform one or more steps or operations of image preprocessing, according to specific embodiments or implementations of the invention. It should be understood that some of these image preprocessing operations may be performed while others may be skipped, according to the specific implementation, the specific positioning of cameras 20, the intrinsic parameters and optical characteristics 120B of cameras 20, and the like. Preprocessing module 140 may perform the steps of image preprocessing in parallel, or sequentially in any preferred order.

For example, camera 20B may be a fisheye camera, located at the front of a platform 200, e.g., on the bumper of vehicle 200, to provide an FOV of forward 180 degrees for near objects' detection. Camera 20A may be located or positioned at the rear part of vehicle 200, and may be a conventional camera for longer ranges, e.g., a pinhole camera. Preprocessing module 140 may crop at least one of images 20A' and 20B' to ensure overlapping of FOVs of the two or more images 20' imaging devices 20.

In another example, one or more imaging devices 20 may render a distorted or partial image of the scene. In such embodiments, preprocessing module 140 may process image 20' by a dedicated image analysis algorithm 140, e.g., a software module or application for correcting such a distortion. For example, a fisheye camera (e.g., 20B) may render a distorted image, characterized by a barrel distortion, as commonly referred to in the art. Preprocessing module 140 may process image 20B' by a dedicated image analysis algorithm or application to correct this distortion, as known in the art.

In another example, preprocessing module 140 apply additional image processing algorithms to mitigate differences between images 20A' and 20B', including for example differences in pixel size, image resolution, image colour (e.g., hue and saturation), brightness, contrast, aspect ratio, glare, and the like.

Processes and procedures included in embodiments of the invention may specifically improve ADAS systems 300 and any application or implementation that include motion, for example, autonomous driving vehicles 200 by simplifying and improving the process of camera installation. For example, embodiments of the invention may render use of a rigid rig for camera installation redundant, allowing car producers to select any desired location for camera installation. Additionally or alternatively system 10 may enable usage of any FOV, e.g., near FOV and far FOV, with any required resolution, without any constraint of sensor 20 similarity.

Reference is also made to FIGS. 4A-4F which are pictorial illustrations of an exemplary installation of system 10, and images taken by system 10, according to embodiments of the invention. As elaborated herein, embodiments of the invention may include locating two or more imaging devices 20A, 20B, having different optical characteristics at two or more locations which may not be stereo-parallel, e.g., when two imaging devices view a 3D scene from two distinct positions which are not parallel, namely when the focal planes of the two imaging devices are not parallel.

Figure 4B:
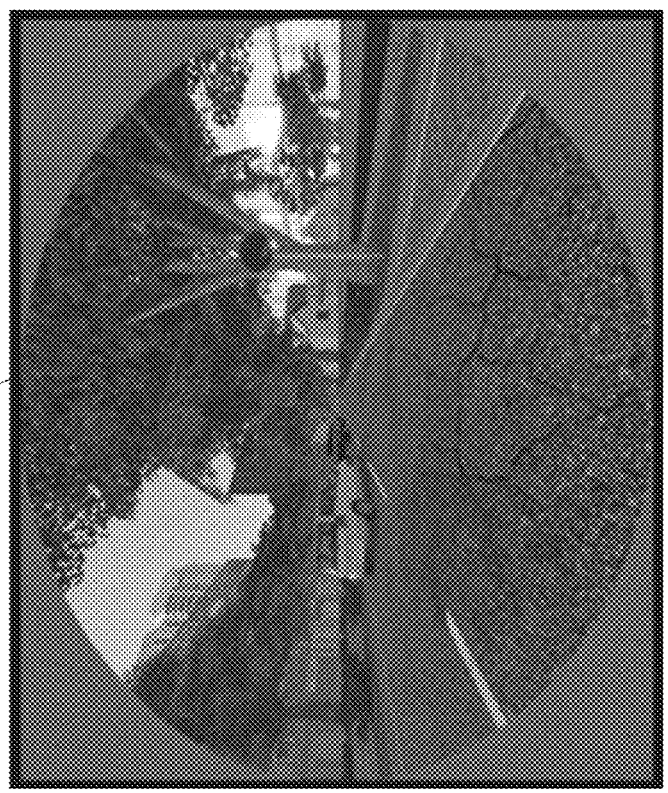
FIGS. 4A-4F, are pictorial illustrations of an exemplary system that may include two imaging devices (e.g., cameras), and images taken by that system, according to embodiments of the invention.
Figure 4A:
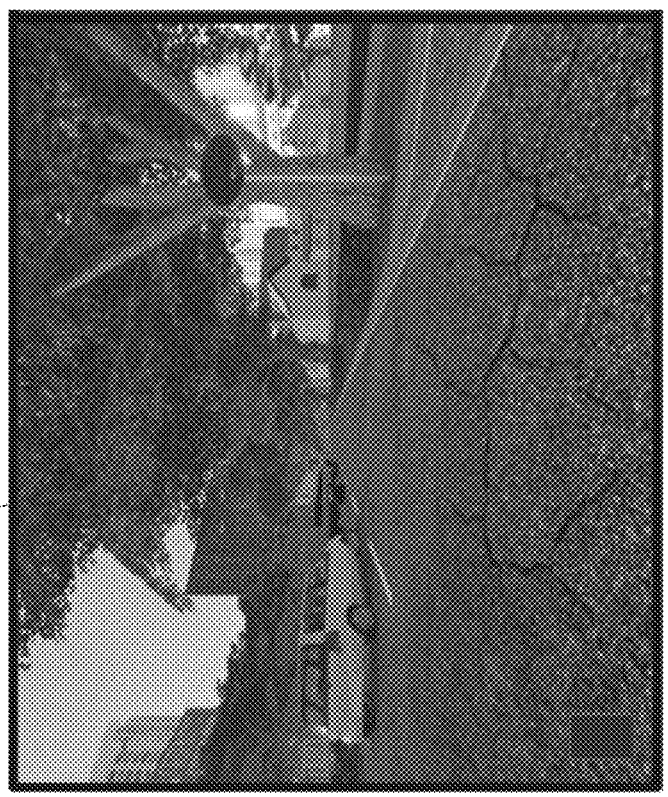
Figure 4D:
Figure 4C:
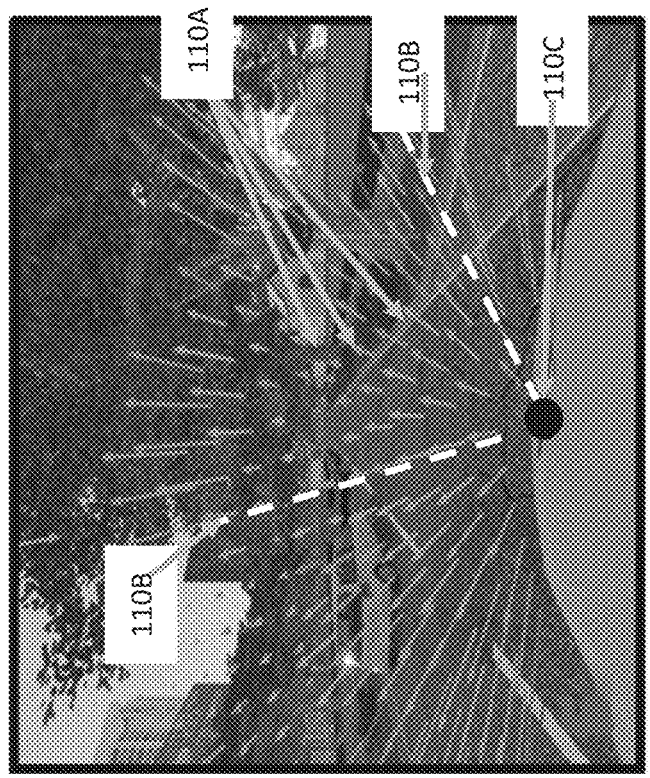
Figure 4F:
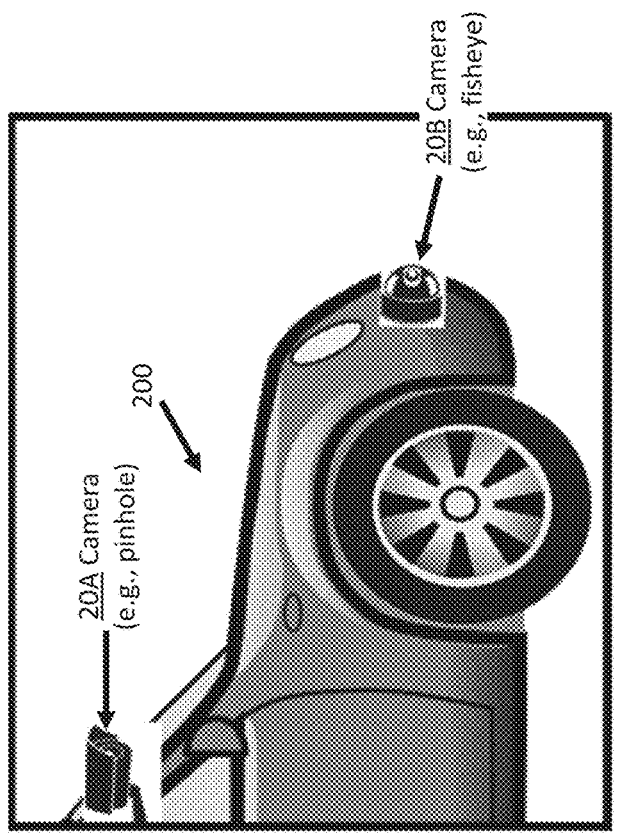
Figure 4E:
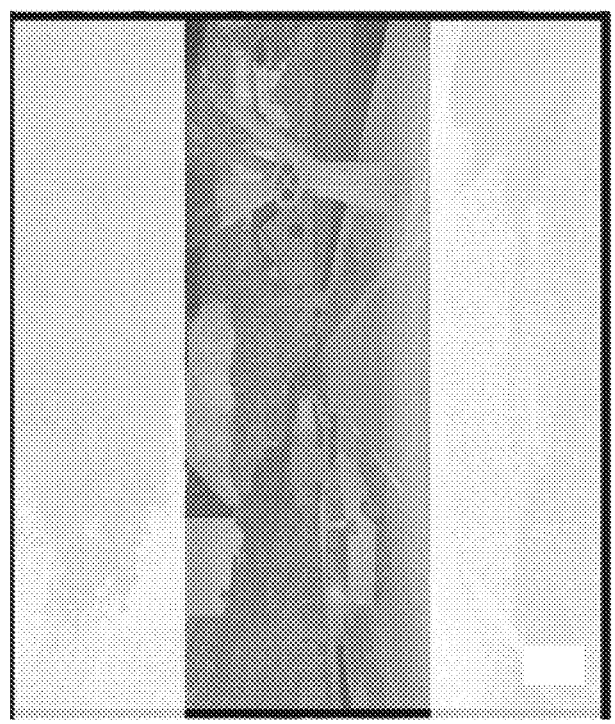

FIG. 4F depicts an exemplary setup of cameras 20 (e.g., 20A, 20B) on a platform 200 such as a car or vehicle 200. Cameras 20A and 20B each have different optical characteristics, and may be located on different locations on vehicle 200. Camera 20A and camera 20B may be located in non-parallel locations, e.g., non-stereo parallel where their focal planes are not parallel planes. For example, a large FOV camera (e.g., camera 20B in FIG. 4F) may be placed, positioned, or located in the front part of vehicle (e.g., car) 200, e.g., for capturing objects located in proximity to vehicle 200 while a large focal length camera (e.g., camera 20A in FIG. 4F) may be placed, positioned, or located in the rear part of car 200, e.g., for capturing objects located far away from car 200.

According to embodiments of the invention, camera 20A having a first FOV may capture a first image 20A' of a scene while being located at a first position (e.g., at a rear side of a vehicle 200). A second imaging device, e.g., camera 20B having a second FOV may capture a second image 20B' of the scene while being located at a second position (e.g., at a front side of vehicle 200).

FIG. 4A depicts an image 20A' captured or taken by camera 20A while FIG. 4B depicts an image 20B' captured or taken by camera 20B. In some embodiments of the invention, camera 20A and camera 20B may capture a 3D scene from two distinct, non-parallel positions, therefore a plurality of geometric relations may exist between the 3D points of the captured 3D scene and their projections onto each of the two-dimensional (2D) images 20' captured by each of the cameras. This may lead to one or more constraints, restrictions or limitations between corresponding points or pixels of the captured images 20'.

FIG. 4C is an illustrative depiction of an optical flow, between the images 20A' and 20B' depicted in FIG. 4A and FIG. 4B respectively.

As known in the art, the term "optical flow" may refer to a pattern of apparent motion or change of objects, surfaces, and edges in a visual scene that may be caused by relative motion between an observer and a scene. In the context of the present invention, and as shown by arrows 110A in FIG. 4C, an optical flow may refer to an alignment or association between at least one (e.g., each) pixel in image 20A' taken by camera 20A (e.g., depicted in FIG. 4A) and at least one (e.g., each) counterpart or corresponding pixel in image 20B' taken by camera 20B (e.g., depicted in FIG. 4B).

As shown in FIG. 3A, system 10 may include an optical flow module 110, configured to determine an optical flow 110A data element (or "optical flow 110A" for short). Optical flow 110A may for example be a table that represents data flow between images 20A' and 20B'. In other words, optical flow 110A may match between 2D locations or pixels in image 20A' and corresponding 2D locations or pixels in image 20B'. The term "corresponding" may be used in this context to indicate regions in images 20A' and 20B' that depict of describe the same regions in the scene. Optical flow module 110 may produce optical flow 110A by associating one or more pixels or regions in image 20A' taken by camera 20A to one or respective pixels or regions in image 20B' taken by camera 20B, as shown by arrows 110A of FIG. 4C.

According to some embodiments, optical flow module may be, or may include a machine-learning (ML) model 111, configured to map between a position of a first pixel in image 20A' and a position of a corresponding pixel in image 20B'.

For example, ML model 111 may be implemented as at least one artificial neural network (ANN) such as a Convolutional Neural Network (CNN), that may receive images 20A' and 20B' as input, and produce optical flow 110A as output. In some embodiments, ML model 111 may be pretrained based on annotated examples of pairs of corresponding regions or pixels (e.g., received via input device 7 of FIG. 1), where one region or pixel each originating from a different image 20'.

Additionally, or alternatively, optical flow module may calculate one or more (e.g., a plurality) of flow lines 110B in a first image (e.g., 20A'), wherein each flow line represents an optical flow 110A between a pixel of the first image (e.g., 20A') and a corresponding pixel of the second image (e.g., 20B'). In some embodiments, flow lines 110B may be calculated as extensions of 2D lines that connect between matching optical flow 2D locations, in the first image (e.g., 20A'), as depicted in the illustrative example of FIG. 4C.

Figure 6B:
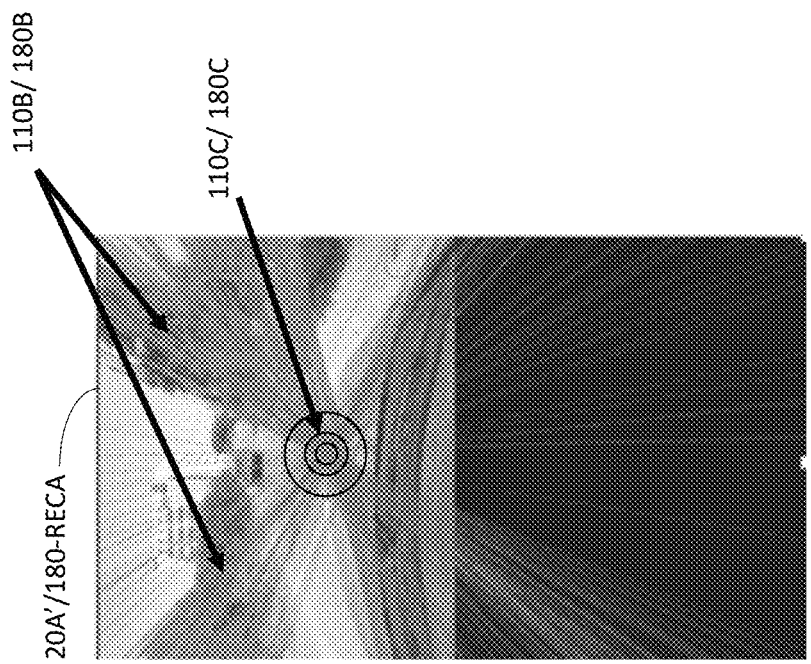
FIG. 6B is a pictorial illustration of flow lines and/or epipolar lines after a calibration process and image rectification, according to some embodiments of the invention.
Figure 6A:
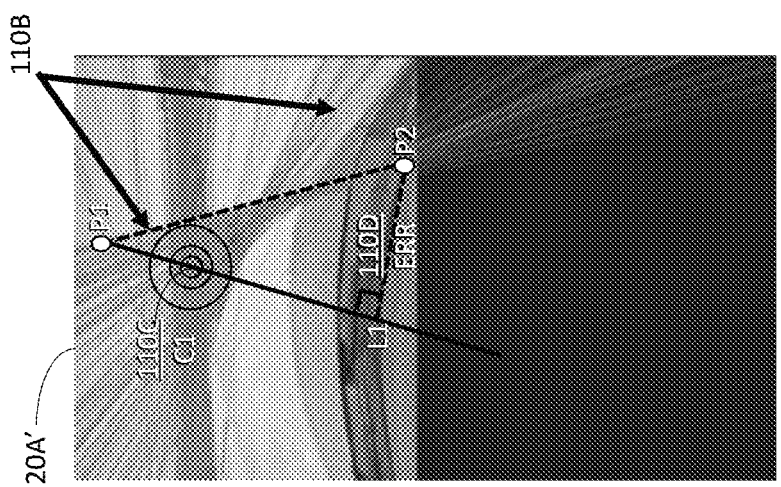
FIG. 6A is a pictorial illustration of flow lines before a calibration process, according to some embodiments of the invention.

Reference is also made to FIGS. 6A, and 6B. FIG. 6A is a pictorial example of flow lines 110B, on a first image 20' (e.g., 20A') before a calibration process, e.g., when imaging devices are not calibrated. FIG. 6B is a pictorial example of flow lines 110B and/or subsequent epipolar lines 180B, on image 20' (e.g., 20A'), which may be obtained by system 10 after a calibration process, and a subsequent optional image rectification process as elaborated herein, according to some embodiments of the invention.

According to some embodiments, system 10 may include a calibration module 120, adapted to calibrate imaging devices 20 by determining at least one parameter of relative position 120A between the first imaging device 20A and second imaging device 20B. As elaborated herein, calibration module 120 may perform this calibration process based on the calculated flow lines 110B, thereby reducing consumption of computational resources in comparison to currently available methods of stereoscopic system calibration, such as bundle adjustment calibration.

Figure 5:
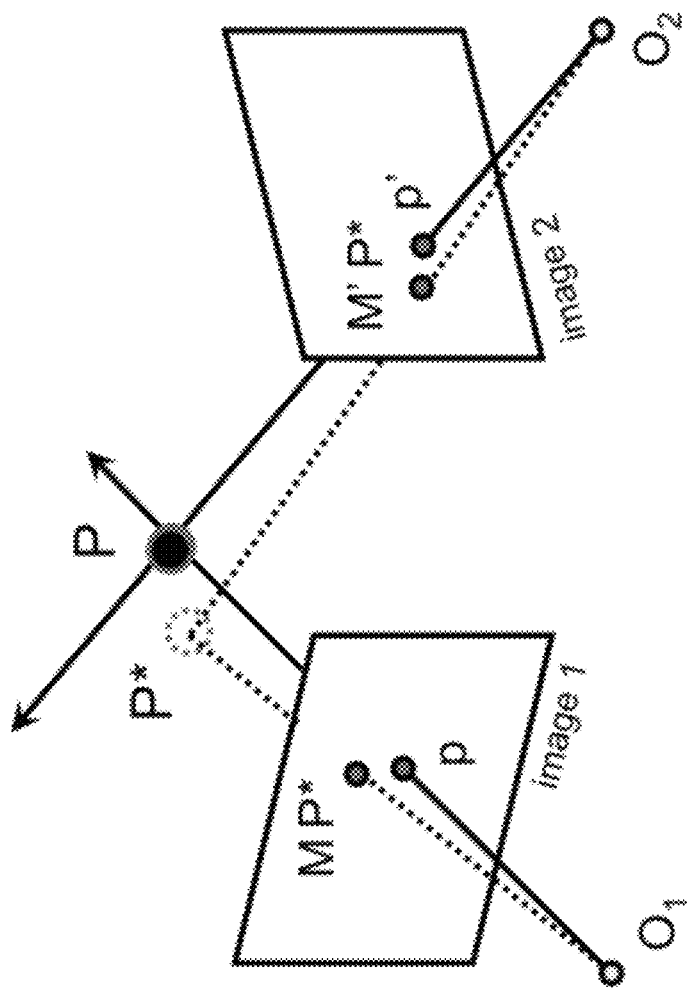
FIG. 5 is a schematic diagram depicting terms and principles of bundle adjustment calibration, as known in the art.

FIG. 5 is a schematic diagram which depicts terms and principles of a process of bundle adjustment calibration, as known in the art.

As known in the art, bundle adjustment calibration is a process by which (a) 3D coordinates describing the scene, (b) relative positioning parameters (e.g., 120A) between cameras 20, and (c) intrinsic optical characteristics 120B of cameras (e.g., 20) may be calculated, based on acquired images (20') of a scene, acquired from different angles. As shown in FIG. 5, bundle adjustment calibration requires tracing of light rays originating from each feature (denoted P) in the scene, and converging on each camera's optical center (denoted O1 and O2), to calculate a reprojection error. The reprojection error defines a difference between the image locations of observed and predicted image points (depicted in FIG. 5 as two points in each of images 1 and 2). The bundle adjustment calibration process seeks to minimize the reprojection errors, by iteratively optimizing, or calculating (a-c) above.

As explained in relation to FIG. 5, currently available methods of calibration must iteratively traverse over a large number of data points, each relating to specific 3D coordinates, and dependent upon a plurality of intrinsic camera parameters 120B. It may be appreciated by a person skilled in the art, that such processes are computationally intensive, and may even become prohibitively complicated. This is especially relevant in applications where the scene may continuously change (e.g., automotive applications). According to some embodiments, calibration module 120 may perform this calibration process based on the calculated flow lines 110B, i.e., based on 2D geometry, and in relation to a limited number of extrinsic, relative position parameters 120A, and may therefore greatly simplify the calibration of stereoscopic imaging systems 10.

The terms "intrinsic camera parameter" or "intrinsic parameter" may be used herein to indicate parameters 120B of cameras 20 that pertain to a structure of a specific camera or imaging device, including for example a focal length, a field of view, an image distortion, and the like.

The terms "extrinsic camera parameter" or "extrinsic parameter" may be used herein to indicate parameters of cameras 20 that pertain to a camera's inclusion or integration into system 10, including for example a physical location of the camera (e.g., represented by cartesian coordinates [X, Y, and/or Z]), orientation of the camera (e.g., in the Pitch, Yaw and/or Roll axes), and the like.

The term "relative position parameter 120A" may be used herein to indicate a relation between extrinsic parameters of cameras 20A and 20B, including for example, a translation (e.g., a difference in coordinates [X, Y, and/or Z]) between cameras 20A and 20B, a difference in orientation (e.g., difference in Pitch, Yaw and/or Roll axes) between cameras 20A and 20B, and the like.

In another example, relative position parameter 120A may include at least one of a length and/or an orientation of a translation vector, defined by location of cameras 20A and 20B. Such embodiments may be particularly useful, for example, in applications of system 10 on moving or shaky platforms 200, such as cars: in such implementations, a distance between cameras 20A and 20B may be kept substantially the same, whereas the orientation of the translation vector may change significantly over time.

According to some embodiments, calibration module 120 may be configured to calibrate the imaging devices in an iterative calibration process. Each iteration of the calibration process may include prediction or estimation of value of a relative position parameter 120A, and a complementary update of one or more flow lines, based on the relative position parameter 120A value.

Additionally, or alternatively, each iteration of the calibration process may include (a) calculation (in a first iteration), or re-calculation (in subsequent iterations) of flow lines 110B, based on (i) location of the pixels in the first image and location of the corresponding pixels in the second image (e.g., as depicted in FIG. 4C), and (ii) at least one parameter of relative position 120A between the first imaging device (e.g., 20A) and second imaging device (e.g., 20B). For example, in an initial iteration, flow lines 110B may be calculated as a line connecting between pairs of pixels 110A (received from optical flow module 110), and in subsequent iterations flow lines 110B may be calculated while considering a virtual movement or modification of imaging devices 20A/20B, according to the calculated calibration parameters 120A/120B. In some embodiments such calculation may include, for example using a RANSAC (Random Sample Consensus) algorithm, in which a subset of the flow lines may be chosen to estimate the calibration parameters, and subsequently the error on all flow lines may be calculated based on the selected lines, thereby reducing the influence of outliers.

Each iteration of the calibration process may further include adjusting the at least one parameter of relative position 120A, such that flow lines 110B pass through, or intersect at a region of convergence (ROC) 110C in the first image 20A' or in a plane of the first image 20A', as depicted in the examples of FIGS. 4C and 5B. In other words, the at least one parameter of relative position 120A may be adjusted such that under a closed set of constraints, the majority of the flow lines 110B may converge to the minimal convergence area.

It may be appreciated that ROC 110C may initially be located beyond a matrix of pixels that represent first image 20A', and may be moved into that matrix of pixels as part of an iterative calibration process, as elaborated herein. In this context, the term "plane" may be used to indicate a theoretic 3D spatial plane, which may be spatially aligned or converged with image 20A', and may continue image 20A' to include the location of ROC 110C.

Calibration module 120 may be configured to continue the iterative calibration process until a predefined stop condition is met.

For example, calibration module 120 may continue the iterative calibration process, and recalculate flow lines 110B until ROC 110C is confined to a minimal radius around a point, or a predetermined location in first image 20A'. In other words, the iterative calibration process may continue until one or more (e.g., all) flow lines 110B pass near predetermined location in a plane of first image 20A', in a distance that does not exceed a predefined radius.

Additionally, or alternatively, calibration module 120 may continue the iterative calibration process, and recalculate flow lines 110B until ROC 110C reaches a minimal size (e.g., no longer converges into an increasingly smaller area or radius).

Additionally, or alternatively, the iterative calibration process may include calculation of at least one convergence error 110D value, representing distance of at least one flow line 110B from the region of convergence 110C.

For example, as depicted in FIG. 6A, a first point (denoted P1), may represent a pixel depicting a specific object in first image 20A', and a second point (denoted P2), may represent location of a corresponding pixel (e.g., depicting the same object), in second image 20B', as obtained from optical flow module 110. A flow line 110B may define the line between these points in image 20A'. A second line, denoted L1 may represent an extension of a line that connects P1 with a center of region of convergence 110C at its current location (e.g., in the current iteration). In this example, a convergence error 110D pertaining to at least one flow line 110B may be defined by a metric or a function (e.g., sum) of distances of the at least one flow lines 110B from region of convergence 110C.

In such embodiments, at each iteration of the calibration process, calibration module 120 may calculate or adjust a value of a parameter of relative position 120A to minimize convergence error value 110D.

Pertaining to the example of FIG. 6A, the parameter of relative position 120A may be an orientation of camera 20B. It may be appreciated that the calculated adjustment of the value of parameter 120A may alter location P2 (that represents a pixel of image 20B') in image 20A', thereby changing location of flow line 110B and/or convergence region 110C in image 20A', to minimize convergence error value 110D.

Additionally, or alternatively, each iteration may be dedicated to, or apply changes to a different set of parameters of relative position 120A. In other words, each pair of consecutive iterations may include a first iteration, in which calibration module 120 may adjust at least one first parameter of relative position 120A (e.g., relative translation between cameras 20 in the X axis), and a second iteration, in which calibration module 120 may adjust at least one second, different parameter of relative position 120A (e.g., relative orientation between cameras 20 in the pitch axis).

According to some embodiments, calibration module may perform the iterative calibration process of imaging devices 20 repeatedly over time, e.g., to maintain accuracy of calibration in mobile implementations of system 10. In such embodiments, at each repetition, the first imaging device 20A and the second imaging device 20B may be synchronized by synchronization module 150 to produce respective images of the scene substantially at the same time.

Figure 3B:
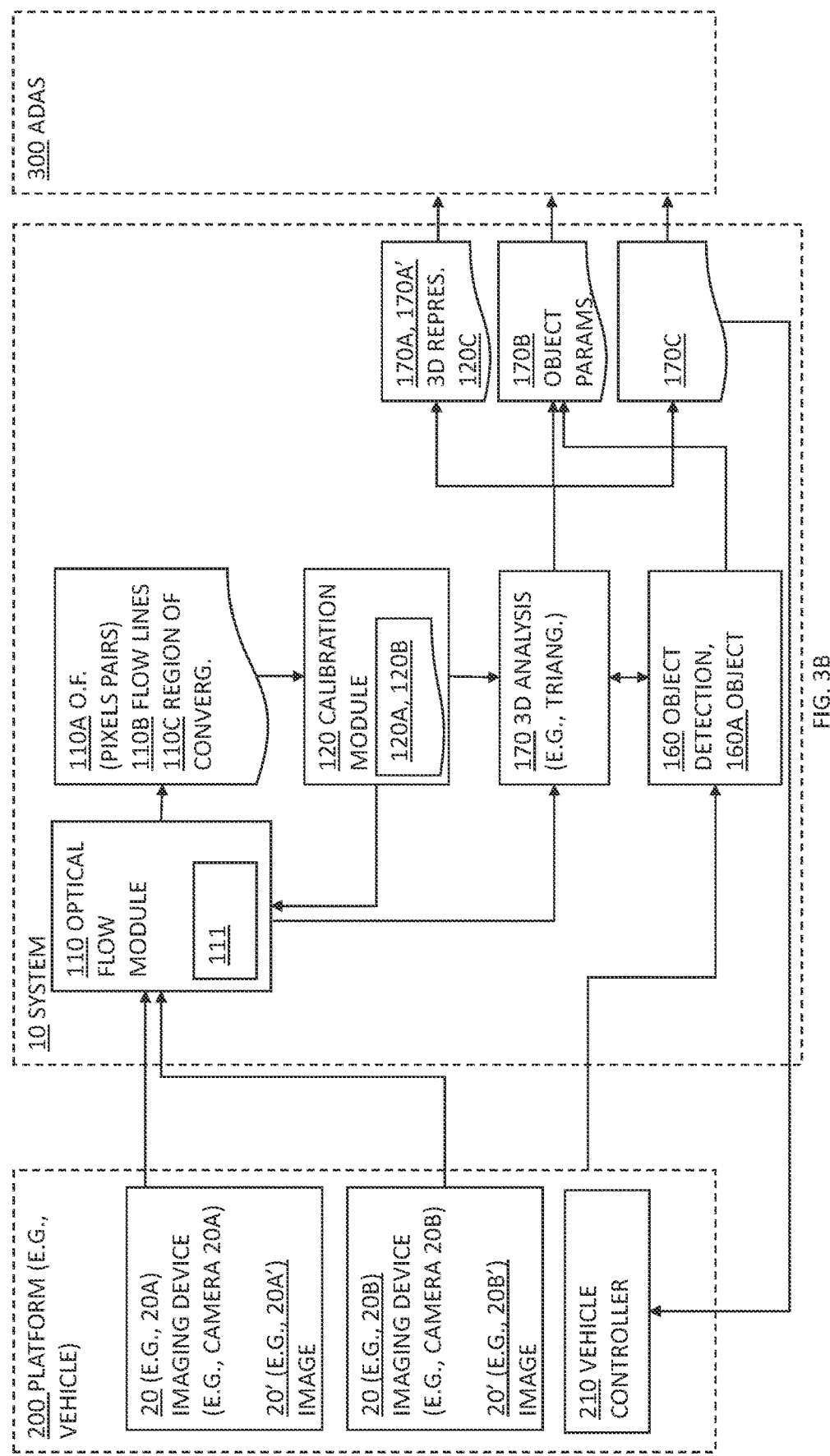

Reference is now made to FIG. 3B, which is a block diagram depicting aspects of a system 10 for stereoscopic image analysis, according to some embodiments of the invention. System 10 of FIG. 3B may be, or may include the same system 10 as depicted in FIG. 3A.

According to some embodiments, system 10 may include a 3D analysis module 170, configured to triangulate between one or more pixels depicted in image 20A' and one or more corresponding pixels depicted in image 20B'. 3D analysis module 170 may perform this triangulation based on optical flow 110A (from optical flow module 110), e.g., based location of the one or more pixels in image 20A', in relation to location of one or more corresponding pixels in image 20B'. Additionally, 3D analysis module 170 may perform the triangulation further based on, or considering the at least one parameter of relative position 120A (from calibration module 120).

3D analysis module 170 may thus obtain 3D coordinates 170A of one or more respective points in the scene, based on the process of triangulation, as known in the art. Additionally, or alternatively, 3D analysis module 170 may obtain 3D coordinates 170A of a sufficient number of points in the depicted scene, so as to produce a 3D representation 170A' of at least a portion the scene. In other words, the calculated 3D coordinates 170A may comprise or constitute a 3D representation 170A' of the scene, as shown in FIG. 4D (depicting a depth ground truth image of the scene of FIGS. 4A and 4B) and FIG. 4E (depicting a calculated 3D representation 170A' that may be generated according to embodiments of the invention).

For example, calculated 3D representation 170A' may be, or may include a data structure (e.g., a tensor or matrix) that may represent a depth map, a disparity map, a point cloud and the like, as known in the art.

According to some embodiments, 3D representation 170A' may be associated with one or more values of confidence level 120C. For example 3D representation 170A' may be a point cloud, in which one or more (e.g., each) point may represent a spatial point (e.g., having X, Y and Z coefficients) in the depicted scene, and wherein one or more (e.g., each) point may be associated, or attributed a confidence level 120C.

In some embodiments, 3D representation 170A' may be presented (e.g., by output device 8 of FIG. 1, such as a monitor screen) according to confidence level 120C. Pertaining to the point cloud example, each point may be associated with a color or brightness, in a scale that represents respective confidence levels 120C.

Additionally, or alternatively, confidence level 120C may be equal to, or may be calculated from convergence error 110D. Pertaining to the example of FIG. 6A, confidence level 120C may represent closeness of flow line 110B to ROC 110C, and may be calculated as an inverse value of convergence error 110D.

In some embodiments, 3D analysis module 170 may determine 3D coordinates 170A representing distances or depths of one or more points in the 3D scene, by performing triangulation on a pixel basis, considering the two cameras' 20 different focal lengths and positions (e.g., relative position parameter values 120A). During such triangulation, 3D analysis module 170 may consider pixels that correspond to the same 3D point in a scene (e.g., a first pixel from image 20A' and a corresponding pixel from image 20B') The projection lines of these pixels may intersect precisely at a point in the 3D scene that may be calculated from the coordinates of the two image points.

System 10 may employ 3D analysis module 170 to implement triangulation in a plurality of methods for matching stereoscopic images. Such methods may include, for example block matching and semi-global matching, as known in the art.

Additionally, or alternatively, system 10 may include an object detection module 160, configured to detect at least one object 160A (e.g., a person, a car, a motorcycle, etc.) from at least one image (e.g., 20A', 20B'). For example, object detection module 160 may be, or may include a machine-learning (ML) based model, configured to identify, segment and/or otherwise represent an object 160A depicted in at least one image (e.g., 20A', 20B'), as known in the art.

It may be appreciated that the same object may look different or slightly different in any of the images taken from respective points of view of cameras 20. However, based on parameters 120A of the plurality of cameras 20, as provided by calibration module 120, 3D analysis module 170 may easily produce a 3D representation 170A' of an object 160A included in the depicted scene.

Figure 3C:
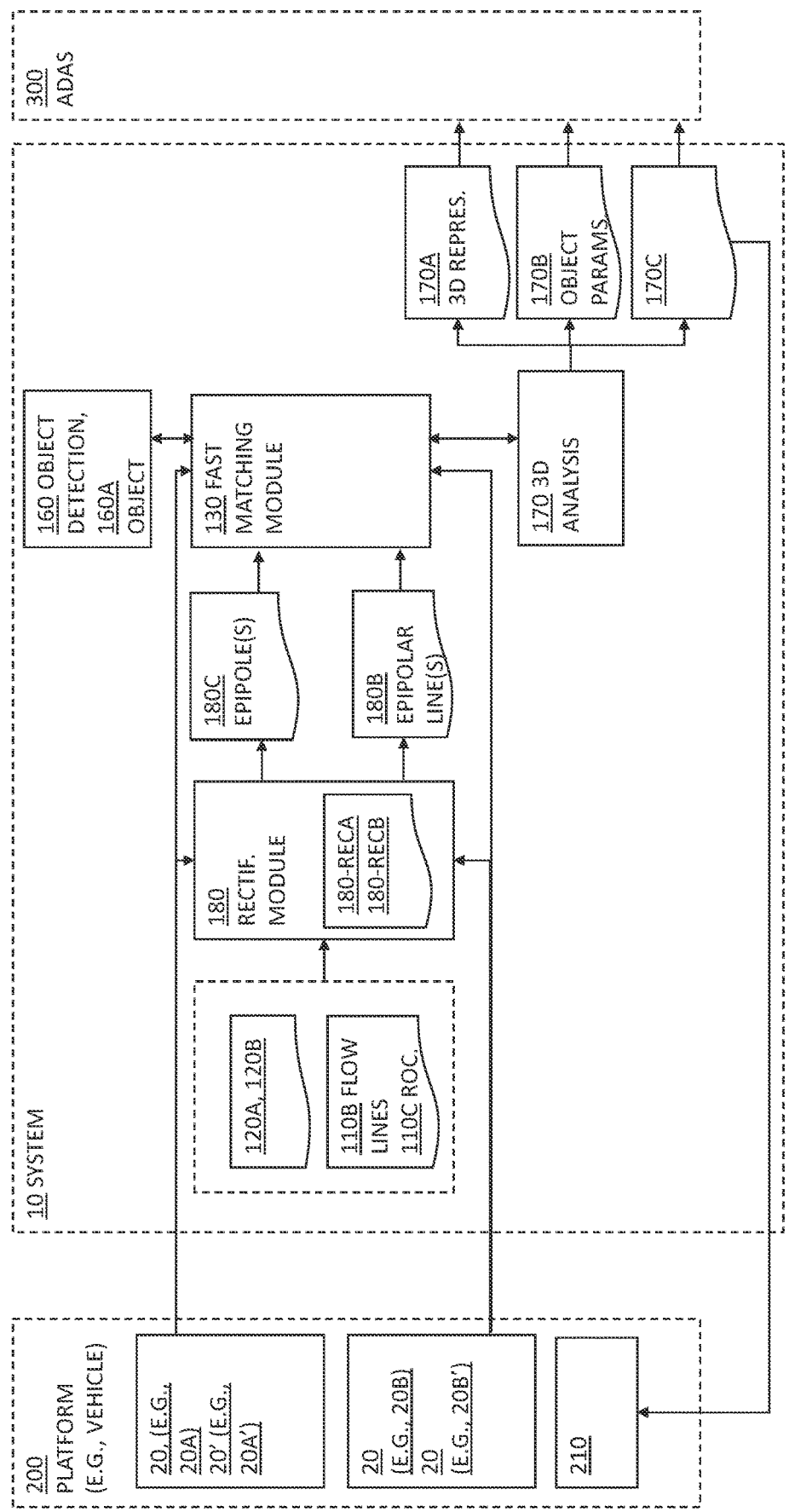

Reference is now made to FIG. 3C, which is a block diagram depicting aspects of a system 10 for stereoscopic image analysis, according to some embodiments of the invention. System 10 of FIG. 3C may be, or may include the same system 10 as depicted in FIG. 3A and/or FIG. 3B.

As shown in FIG. 3C, system 10 may include a rectification module 180, configured to analyze at least one of image 20A' and image 20B' to produce, based on the plurality of flow lines 110B, a respective plurality of straight epipolar lines 180B having a common origin point 180C. The common origin point 180C may correspond to, or be derived from the region of convergence 110C in image 20A' after the process of rectification, and may be referred to herein as an Epipole 180C.

System 10 may be employed to process highly distorted images 20', e.g., images acquired by cameras 20 characterized by intrinsic parameters 120B such as a short focal length, a wide field of view, and/or any other type of optical distortion. It has been experimentally observed that when images 20A' and/or image 20B' include such distortion, flow lines 110B may not converge into a required ROC 110C.

According to some embodiments, rectification module 180 may analyze or process images 20A' and/or 20B' by applying an image rectification function. In other words, rectification module 180 may rectify images 20A' and/or 20B', to produce respective first rectified image 180-RECA and second rectified image 180-RECB, as known in the art.

It may be appreciated that rectified images 180-RECA and 180-RECB may be characterized by having similar camera parameters (e.g., FOV, aspect ratio, resolution, etc.) and/or similar orientation (e.g., in the pitch, yaw and/or roll axes). Additionally, or alternatively, rectified images 180-RECA and 180-RECB may be characterized by having a minimal level of image distortion. Therefore, images 180-RECA and 180-RECB may include alignment of flow lines 110B (e.g., as depicted in FIGS. 6A and 6B as part of first image 20A') into straight epipolar lines 180B, that intersect at the common origin point 180C in a plain of the first rectified image 180-RECA.

In other words, epipolar lines 180B may correspond to flow lines 110B of image 20A' in a sense that epipolar lines 180B may be derived from of flow lines 110B during rectification of images 20A' and 20B' (e.g., during creation of rectified images 180-RECA and 180-RECB).

Additionally, or alternatively, the common origin point (e.g., epipole 180C) may correspond to region of convergence 110C in a sense that epipolar lines 180B may converge into within a minimal area in rectified image 180-RECA, the center of which represents the predefined intersection point of flow lines 110B in image 20A', following image rectification.

As elaborated herein (e.g., in relation to FIG. 3A), each flow line 110B may represent an optical flow between a pixel of a first image 20A' and a corresponding pixel of the second image 20B'. Therefore, each epipolar line 180B may be viewed as representing an optical flow between a pixel of the first rectified image 180-RECA and a corresponding pixel of the second rectified image 180-RECB.

As shown in FIG. 3C, system 10 may include a fast matching module 130 (or "module 130" for short). As elaborated herein, module 130 may be configured to match one at least one pixel, patch or region in rectified image 180-RECA with at least one corresponding pixel, patch or region in rectified image 180-RECB by exploiting the benefit of epipolar geometry as elaborated herein (e.g., in relation to FIG. 2). The term "fast" may be used in this context to indicate that module 130 may map between corresponding regions in images 20A' and 20B' (or between 180-RECA and 180-RECB) by limiting a search for compatible or corresponding pixels along epipolar lines 180B, based on the constraints of epipolar geometry, as explained herein.

Given a location of one or more first pixels in image 180-RECA (e.g., rectified version of image 20A'), module 130 may limit a search for the one or more corresponding pixels in image 180-RECB (e.g., rectified version of image 20B') along an epipolar line 180B of the plurality of epipolar lines.

In other words, module 130 may be configured to select a first pixel in the first rectified image 180-RECA, and identify an epipolar line 180B that connects that pixel with the common origin point 180C in the first rectified image, e.g., as depicted in the example of FIG. 6B. Module 130 may then identify a subset of pixels in the second rectified image 180-RECB, that pertain to, or are defined by a location of the determined epipolar line in the first rectified image. For example, the selected subset of pixels in second rectified image 180-RECB may correspond to, or depict the same portions of the scene, as the pixels along epipolar line 180B in first rectified image 180-RECA. In another example, the selected subset of pixels in second rectified image 180-RECB may correspond to pixels that are defined by an area that surrounds the same portions of the scene as the pixels along epipolar line 180B in first rectified image 180-RECA, within a predetermined distance or radius.

Module 130 may then select a second pixel among the subset of pixels as matching the first pixel of the first rectified image. Module 130 may perform this selection based on a predetermined similarity metric.

For example, module 130 may select the matching pixel as the one most similar in color, or brightness to that of the first pixel. Additionally, or alternatively, module 130 may select the matching pixel based on regional, or morphological features, in a window surrounding the member pixels of the subset of 180-RECB pixels.

Additionally, or alternatively, matching module 130 may perform the matching process by applying a transformation of coordinates on at least one of rectified images 180-RECA and 180-RECB, e.g., from cartesian coordinates to polar coordinates. In such embodiments, matching module 130 may represent image 180-RECA with polar coordinates, having the epipole of camera 20B as the origin point of these polar coordinates, and then easily finding the corresponding pixel in image 20B' by using the polar coordinates' representation of image 20A'. Following the epipolar geometry based, fast matching process of module 130, 3D analysis module 170 may apply a depth estimation algorithm (e.g., triangulation) to one or more pairs of points depicted by images 180-RECA and 180-RECB, thereby determining distance of one or more points in the depicted scene, as elaborated herein. 3D analysis module 170 may perform such depth estimation by triangulating pairs of corresponding pixels, while considering the two cameras' 20 different focal lengths and positions. Additionally, or alternatively, 3D analysis module 170 may produce a 3D representation 170A (e.g., a depth map) of the captured scene, as elaborated herein.

As elaborated herein, system 10 may include any combination of two or more cameras 20 or imaging devices 20 to capture or take two or more pictures 20' or images of the same scene, area, zone, region or any other view. The two or more cameras 20 may be positioned or located such that each of the cameras may take a picture or image from a different point of view, e.g., different angle of view of the same scene. System 10 may receive the plurality of images 20' from the two or more imaging devices 20, and 3D analysis module 170 may subsequently be able to estimate a plurality of parameters, characteristics and/or features 170B of a plurality of objects 160A in the images. Such object parameters 170B may include, for example a range of an object 160A, a size of an object 160A, a height of an object 160A, breadth of an object 160A, velocity of an object 160A, location of an object 160A, depth of an object 160A and the like.

It may be appreciated that the same object 160A may look different in any of the images taken from respective points of view of cameras 20. However, based on the calibration and/or rectification of images 20A' and/or 20B' as elaborated herein, matching module 130 may easily match between a first object 160A, as captured by a first image (e.g., 20A'), and an expected location of the depicted object in the complementary image (e.g., 20B'), by restricting the search for the matching object to a specific area, e.g., along or around pixels of epipolar lines 180B, as elaborated herein.

According to some embodiments, object detection module 160 may apply an object-detection algorithm on the first rectified image 180-RECA to identify an object 160A depicted in the first image 20A'. Fast matching module 130 may then match the detected object 160A in the first image with a corresponding area or object in the second rectified image 180-RECB, by allowing object detection module 160 to search the corresponding object along epipolar line 180B of the plurality of epipolar lines 180B. Thus, system 10 may exploit the constraints of epipolar geometry to reduce the computational load of the search process, and expedite detection of objects 160A in image 20B'.

As elaborated herein, embodiments of the invention may include a stereoscopic imaging system 10 that may include two, possibly synchronized, imaging devices or sensors 20 (e.g., elements 20A, 20B), that may have parallel imaging planes.

Rectification in such a system may include image transformation for each of the sensors 20 (e.g., 20A, 20B), such that their images (e.g., 20A', 20B' respectively) are warped to simulate images (e.g., denoted herein as images 180-RECA, 180-RECB, respectively) produced by virtual sensors. These virtual sensors may be located at the same place as sensors 20, and may be rotated to a mutual orientation. The mutual orientation may not necessarily be perpendicular to a translation vector, e.g., the average orientation between the sensors. Such rectification means that in the rectified images 180-RECA, 180-RECB epipolar lines 180B may converge at a single point of convergence, epipole 180C, on the image planes, which may have finite coordinates.

Calibrating system 10 may be done by finding an optical flow 110A between two sensor images 20' (e.g., 20A', 20B') and finding calibration parameters 120A/120B that cause flow lines 110B to converge. In other words, using the calibration 120 to rectify the optical flow coordinates (e.g., by creating rectified images 180-RECA, 180-RECB) will create flow-lines 110B (e.g., now epipolar lines 180B) that converge at a single point of convergence (e.g., epipole 180C).

In other words, using calibration 120, an optical flow 110A may be fit into an epipolar constraint. Alternatively, calibration 120 may be used for an epipolar constraint on an optical flow being estimated. The optical flow output 110A in these ways may be used for 3D reconstruction by triangulation.

When estimating an optical flow 110A, the sensor images 20' may be rectified with a calibration as a pre-process operation. This may reduce the complexity of the optical flow algorithm.

In stereo setups where same-plane rectification includes a large rotation between a sensor and its virtual counterpart a parallel-plane rectification may provide much less rotation, resulting in more detailed rectified images and retain more of the original sensors common field of view. These advantages may be used to estimate more accurate optical flow, calibration, and 3D reconstruction.

Figure 7B:
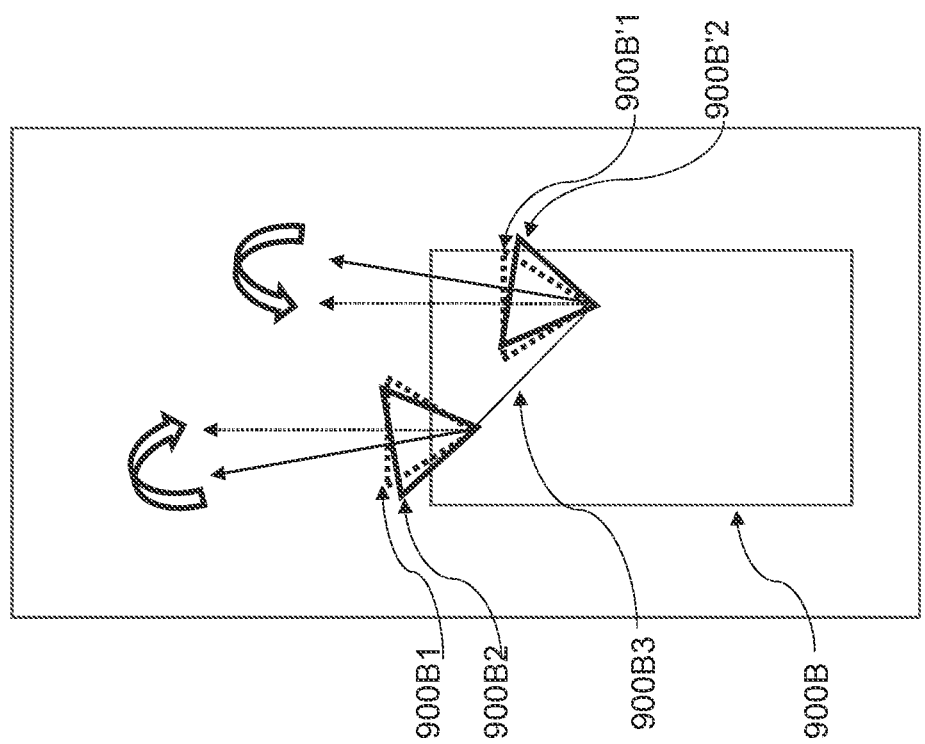
FIGS. 7A and 7B are pictorial illustrations depicting bird-eye view of examples for stereoscopic imaging systems, undergoing single plane rectification, and a parallel plane rectification, respectively.
Figure 7A:
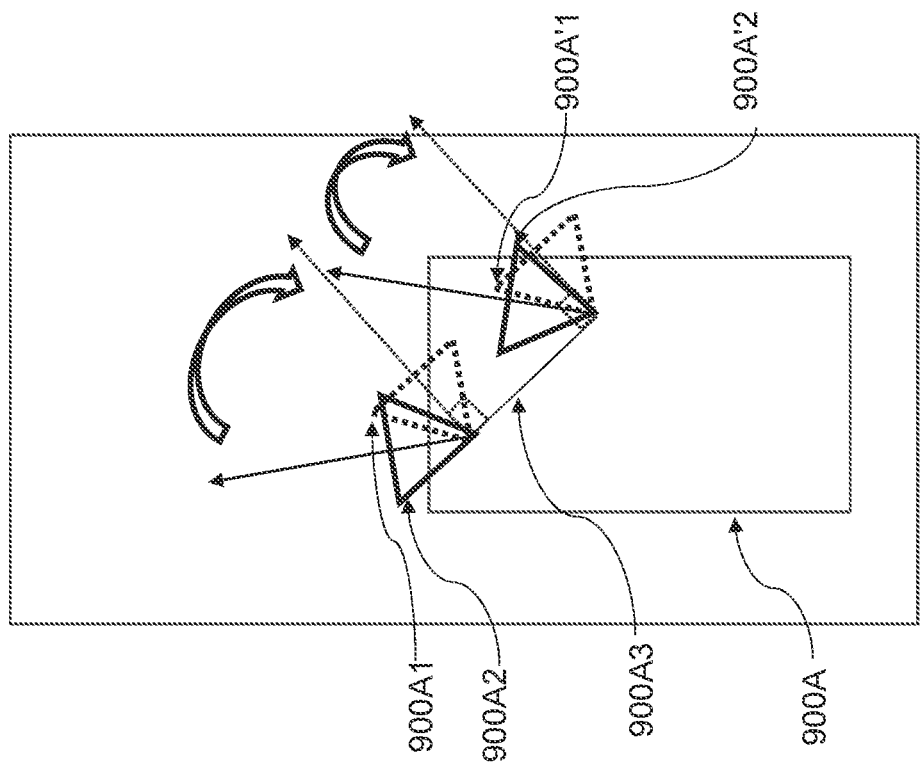

Reference is now made to FIG. 7A and FIG. 7B, which illustrate similar stereoscopic imaging systems (denoted 900A and 900B), each mounting two synchronized imaging sensors from a bird eye view.

FIG. 7A illustrates a single plane rectification process, and FIG. 7B illustrates a parallel-plane rectification process.

As shown in the example of FIG. 7A, system 900A may include imaging sensors 20A and 20B, denoted herein as 900A2 and 900A'2 respectively. The translation vector between sensors 900A2 and 900A'2 is denoted 900A3. In this example, translation vector 900A3 is not perpendicular to any of the sensors' orientations. A rectification 180 of system 900A may include warping the images of sensors 900A2 and 900A'2 to simulate respective, virtual cameras 900A1 and 900A'1. Virtual cameras 900A1 and 900A'1 may have similar intrinsic parameters 120B as those of sensors 900A2 and 900A'2, may be devoid of distortion, and may be rotated so that their orientations are perpendicular to translation vector 900A3. For example, the translation vector 900A3 may be horizontal in relation to the virtual cameras' axes.

As shown in the example of FIG. 7B, system 900B may include imaging sensors 20A and 20B, denoted herein as 900B2 and 900B'2 respectively. The translation vector between sensors 900B2 and 900B'2 is denoted 900B3, and may not be perpendicular to any of the sensors' orientation vectors. A rectification 180 of system 900B may include warping of images of sensors 900B2 and 900B'2 to simulate virtual cameras 900B1 and 900B'1, respectively. Virtual cameras 900B1 and 900B'1 may have similar intrinsic parameters 120B as those of sensors 900B2 and 900B'2, may be devoid of distortion, and may be rotated to a predefined direction, e.g. a front direction of system 900B, and not substantially perpendicular to translation vector 900B3. The virtual camera axes may not be perpendicular to translation vector 900B3.

In other words, according to some embodiments, at least one of the first rectified image 180-RECA and second rectified image 180-RECA may represent a predefined direction of view (e.g., a front view of vehicle 200), that is not substantially perpendicular to (e.g., removed by at least a predefined angle from) translation vector 120A/900A3 which defines the translation between the first imaging device 20A/900B2 and second imaging device 20B/900B'2.

It may be appreciated that the parallel-plane rectification process shown in FIG. 7B includes less virtual rotation than the single plane rectification depicted in FIG. 7A. In other words, there is less rotation between the original cameras and their virtual counterparts in FIG. 7B, in relation to FIG. 7A. Due to this reduced virtual rotation, there is also higher overlap between a camera's FOV and that of it's virtual counterpart in FIG. 7B in relation to FIG. 7A. Subsequently, there is also reduced loss of data in the image rectification process depicted in FIG. 7B, in relation to that of FIG. 7A.

Additionally, due to geometric reasons, epipolar lines 180B in parallel-plane rectified images (e.g., as presented in FIG. 7B) may converge at a center of convergence having finite coordinates. In comparison, epipolar lines in a same-plane rectified images (e.g., as presented in FIG. 7A) may all be horizontal (e.g., converge in infinity).

Figure 8A:
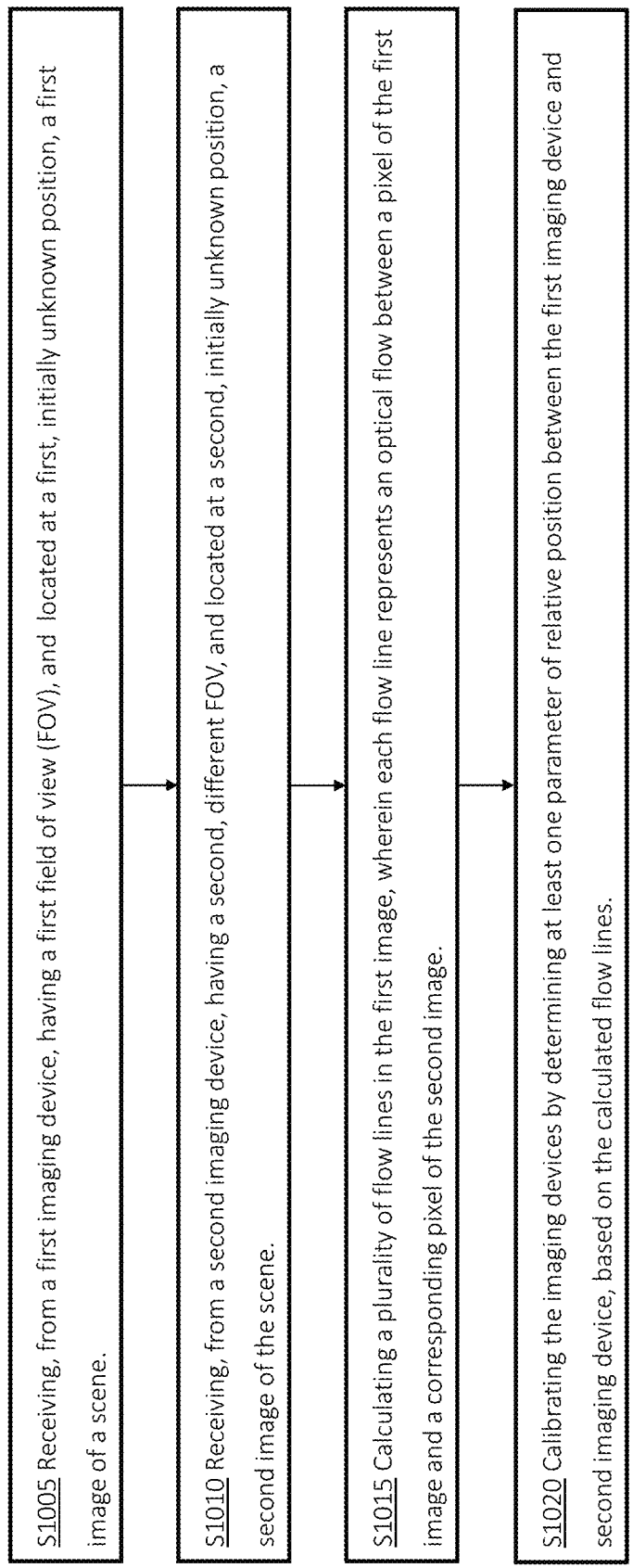
FIG. 8A is a flowchart depicting a method of image analysis, according to some embodiments of the invention.

Reference is now made to FIG. 8A, which is a flowchart depicting a method of image analysis by at least one processor (e.g., processor 2 of FIG. 1) as elaborated herein, according to some embodiments of the invention.

As shown in steps S1005 and S1010, the at least one processor 2 may receive, from a first imaging device or camera 20A, having a first FOV, and located at a first, initially unknown position, a first image 20A' of a scene, and receive, from a second imaging device 20B, having a second, different FOV, and located at a second, initially unknown position, a second image 20B' of the scene.

As shown in step S1015, the at least one processor 2 may calculate a plurality of flow lines 110B in a plane of the first image, wherein each flow line 110B may represent an optical flow 110A between a pixel of the first image 20A' and a corresponding pixel of the second image 20B'.

As shown in step S1020, the at least one processor 2 may calibrate the imaging devices by determining at least one parameter of relative position 120A between the first imaging device 20A and second imaging device 20B, based on the calculated flow lines 110B, as elaborated herein (e.g., in relation to FIG. 3A).

Figure 8B:
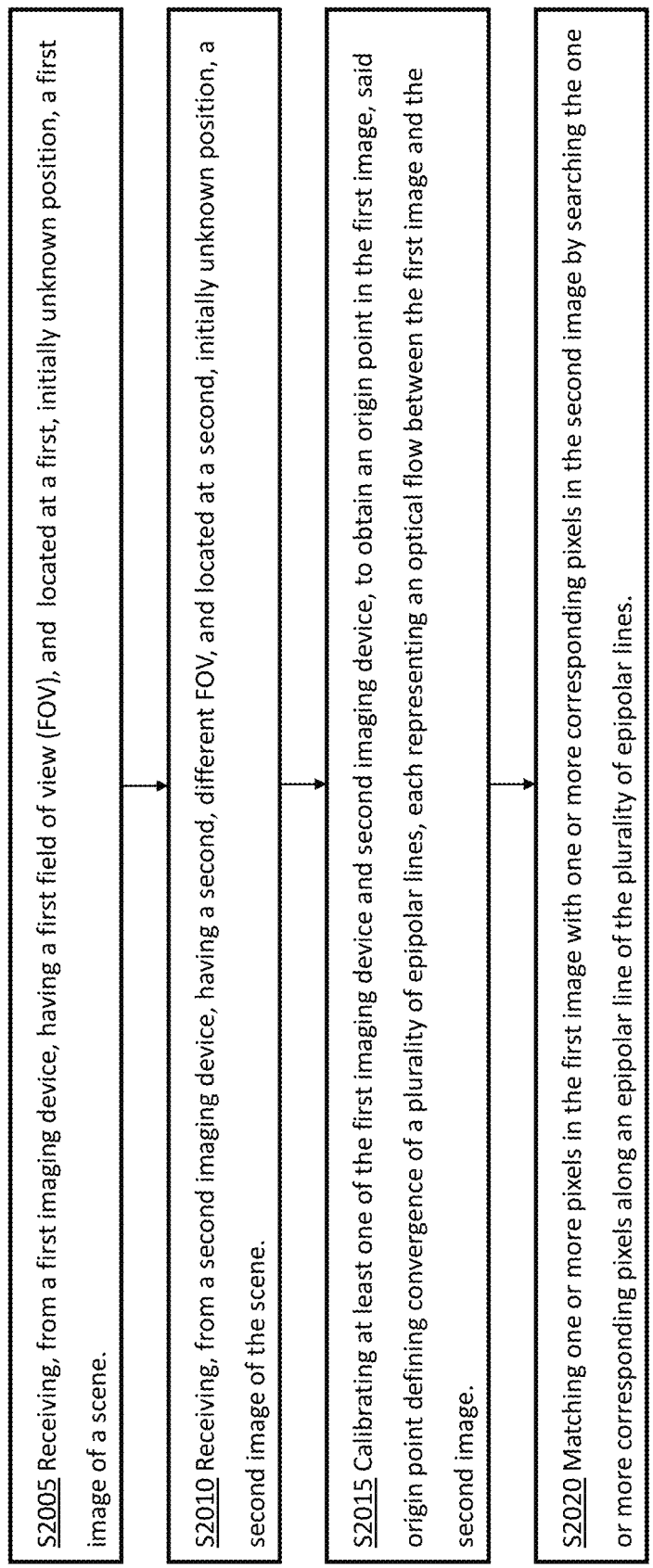
FIG. 8B is a flowchart depicting another method of image analysis, according to some embodiments of the invention.

Reference is now made to FIG. 8B, which is a flowchart depicting another method of image analysis by at least one processor 2 as elaborated herein, according to some embodiments of the invention.

As shown in steps S2005 and S2010, the at least one processor 2 may receive, from a first imaging device or camera 20A, having a first FOV, and located at a first, initially unknown position, a first image 20A' of a scene, and receive, from a second imaging device 20B, having a second, different FOV, and located at a second, initially unknown position, a second image 20B' of the scene.

As shown in step S2015, the at least one processor 2 may calibrate at least one of the first imaging device and second imaging device as elaborated herein (e.g., in relation to FIGS. 3A, 3C, 6A and 6B), to obtain an origin point or epipolar point 180C in a plane of the first image 20A'. The origin point or epipolar point 180C may define convergence of a plurality of epipolar lines 180B in a plane of the first image 20A' (or 180-RECA). As elaborated herein (e.g., in relation to FIG. 3C), each epipolar line 180B may represent an optical flow 110A between the first image 20A' (or 180-RECA) and the second image 20B' (or 180-RECB).

As shown in step S2015, the at least one processor 2 may match one or more pixels in the first image 20A' (or 180-RECA) with one or more corresponding pixels in the second image 20B' (or 180-RECA) by searching the one or more corresponding pixels along an epipolar line 180B of the plurality of epipolar lines 180B.

Figure 8C:
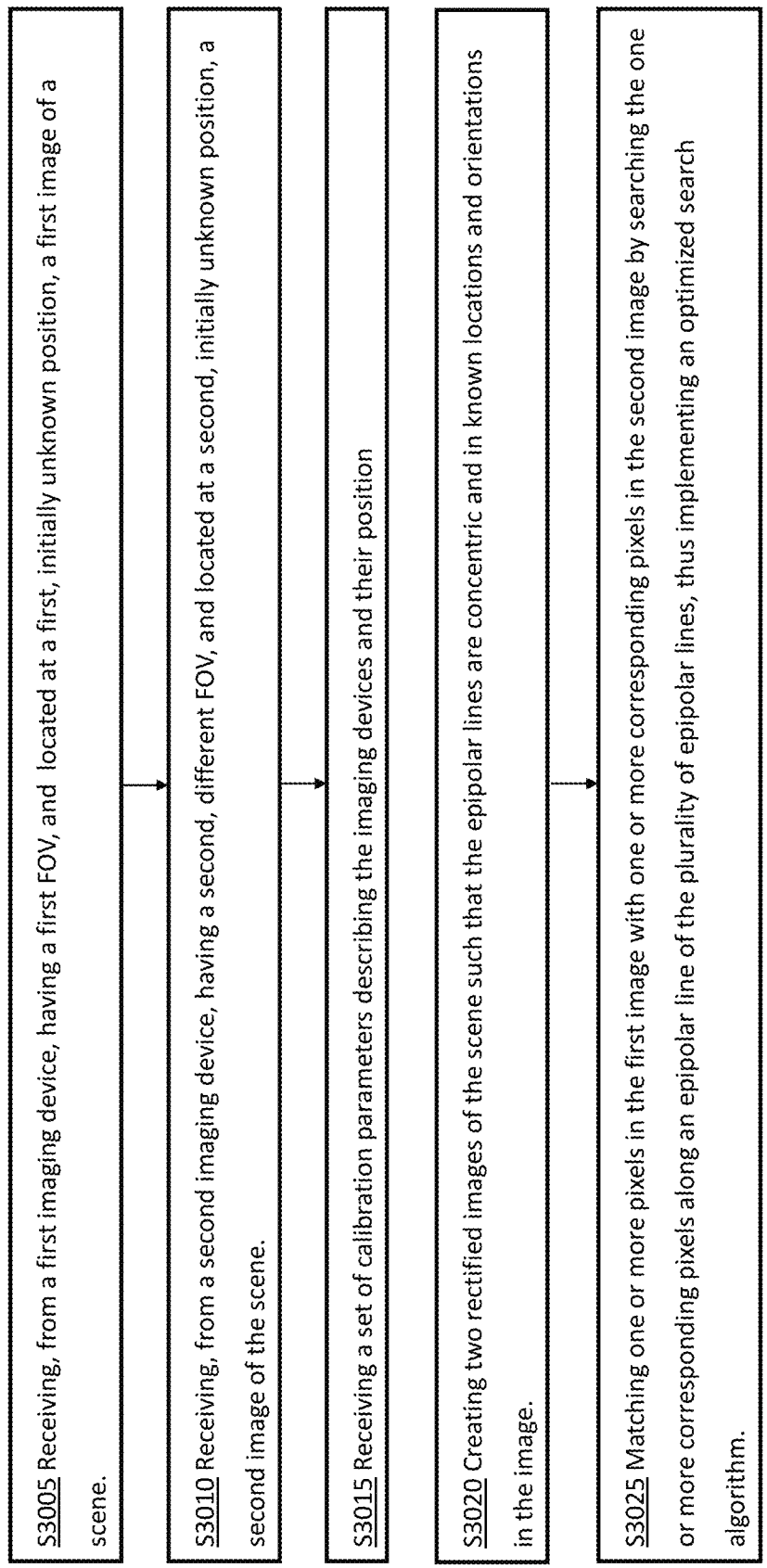
FIG. 8C is a flowchart depicting yet another method of image analysis, according to some embodiments of the invention.

Reference is now made to FIG. 8C, which is a flowchart depicting a method of image analysis by at least one processor (e.g., processor 2 of FIG. 1) as elaborated herein, according to some embodiments of the invention.

As shown in steps S3005 and S3010, the at least one processor 2 may receive, from a first imaging device or camera 20A, having a first FOV, and located at a first, initially unknown position, a first image 20A' of a scene, and receive, from a second imaging device 20B, having a second, different FOV, and located at a second, initially unknown position, a second image 20B' of the scene.

As shown in step S3015, the at least one processor 2 may receive (e.g., via input device 7 of FIG. 1) a set of calibration parameters, including for example parameters of relative position 120A between the first imaging device (e.g., 20A) and second imaging device (e.g., 20B), and/or intrinsic camera parameters 120B.

As shown in step S3020, and as elaborated herein (e.g., in relation to FIG. 3C), the at least one processor 2 (e.g., rectification module 180) may apply a rectification function on images 20A' and 20B', to create two respective, rectified images of the scene (180-RECA and 180-RECB), so as to produce epipolar lines 180B that are concentric, and in known locations and orientations at least one of images 20A' and 20B'. For example, images 180-RECA and 180-RECB may be set so as to dictate an epipole 180C of epipolar lines 180B in a predefined position in a plane of at least one of images 180-RECA and 180-RECB.

As shown in step S3025, and as elaborated herein (e.g., in relation to FIG. 3C), the at least one processor 2 (e.g., fast matching module 130) may match one or more pixels in the first image 20A' (or 180-RECA) with one or more corresponding pixels in the second image 20B' (or 180-RECB, respectively) by searching the one or more corresponding pixels along an epipolar line 180B of the plurality of epipolar lines, thus implementing an optimized search algorithm.

Embodiments of the invention provide a practical application in the technological field of stereoscopic imaging. As elaborated herein, Embodiments of the invention may provide several improvements in computational image analysis, in relation to currently available systems and methods of camera calibration, image matching, distance assessment and 3D image processing.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of stereoscopic image processing by at least one processor, the method comprising:
   receiving, from a first imaging device, having a first field of view (FOV), and located at a first, initially unknown position, a first image of a scene;
   receiving, a second image of the scene from a second imaging device, having a second, different FOV, and located at a second, initially unknown position, and wherein the relative location and orientation between the first imaging device and the second imaging device is unknown;
   calculating a plurality of flow lines in a plane of the first image, wherein each flow line represents an optical flow between a pixel of the first image and a corresponding pixel of the second image; and
   analyzing at least one of the first image and the second image to produce, based on the plurality of flow lines, a respective plurality of epipolar lines having a common origin point that corresponds to a region of convergence in the first image.

2. The method of claim 1, further comprising calibrating the imaging devices in an iterative calibration process, where each iteration of the calibration process comprises:
   calculating the flow lines, based on (a) location of the pixels in the first image and location of the corresponding pixels in the second image, and (b) at least one parameter of relative position between the first imaging device and second imaging device; and
   adjusting at least one parameter of relative position, such that the flow lines intersect at the region of convergence in a plane of the first image.

3. The method of claim 2, further comprising continuing the iterative calibration process until the region of convergence is confined to a minimal radius around a predetermined location in a plane the first image.

4. The method of claim 2, wherein each iteration further comprises calculating a convergence error value, representing distance of at least one flow line from the region of convergence; and wherein adjusting the at least one parameter of relative position comprises calculating a value of the parameter of relative position so as to minimize the convergence error value.

5. The method of claim 2, wherein each pair of consecutive iterations comprises (i) a first iteration, which comprises adjustment of at least one parameter of relative position, and (ii) a second iteration, which comprises adjustment of at least one other parameter of relative position.

6. The method of claim 2, wherein the parameter of relative position is selected from (i) a translation between the first imaging device and second imaging device, and (ii) a difference in orientation between the first imaging device and second imaging device.

7. The method of claim 2, further comprising:
   triangulating between one or more pixels depicted in the first image and one or more corresponding pixels depicted in the second image, based on (a) location of the one or more pixels in the first image, (b) location of the one or more corresponding pixels in the second image, and (c) the at least one determined parameter of relative position; and
   obtaining 3D coordinates of one or more respective points in the scene, based on said triangulation.

8. The method of claim 2, further comprising producing a 3D representation of the scene based on the 3D coordinates of the one or more points in the scene.

9. The method of claim 1, wherein said analysis comprises applying an image rectification function on the first image and on the second image, to produce respective first rectified image and second rectified image, wherein said rectified images are characterized by having a minimal level of image distortion, thereby aligning the flow lines of the first image into straight, epipolar lines that intersect at the common origin point in a plane of the first rectified image.

10. The method of claim 9, wherein at least one of the first rectified image and second rectified image represents a predefined direction of view, that is not substantially perpendicular to a translation vector defining translation between the first imaging device and second imaging device.

11. The method of claim 9, wherein each epipolar line represents an optical flow between a pixel of the first rectified image and a corresponding pixel of the second rectified image.

12. The method of claim 9, further comprising:
   selecting a first pixel in the first rectified image;

identifying an epipolar line that connects the first pixel with the common origin point in the first rectified image;

identifying a subset of pixels in the second rectified image that pertain to a location defined by the determined epipolar line in the first rectified image; and selecting a second pixel among the subset of pixels as matching the first pixel of the first rectified image, based on a predetermined similarity metric.

13. The method of claim 9, further comprising matching one or more pixels in the first rectified image with one or more corresponding pixels in the second rectified image, by searching the one or more corresponding pixels along an epipolar line of the plurality of epipolar lines.

14. The method of claim 9, further comprising:

applying an object-detection algorithm on the first rectified image to identify an object depicted in the first image; and matching the detected object in the first image with a corresponding object in the second rectified image by searching the corresponding object along an epipolar line of the plurality of epipolar lines.

15. The method of claim 1, wherein the calibration of imaging devices is performed repeatedly over time, and wherein at each repetition the first imaging device and the second imaging device are synchronized, so as to produce respective images of the scene substantially at the same time.

16. The method of claim 1, wherein calculating a flow line comprises applying a machine-learning (ML) model on the first image and the second image, to map between a position of a first pixel in the first image and a position of the corresponding pixel in the second image.

17. The method of claim 7, further comprising:

producing at least one notification pertaining to the 3D coordinates of the one or more points in the scene; and transmitting said notification to at least one processor of an Advanced Driver Assisting System (ADAS) in a vehicle, wherein said ADAS processor is configured to display said notification in a user interface (UI) of the ADAS, or transmitting said notification to at least one controller of a vehicle, wherein said vehicle controller is configured to control one or more motors or actuators, to conduct said vehicle based on said notification.

18. A method for image analysis, the method comprising:

receiving, from a first imaging device, having a first field of view (FOV), and located at a first, initially unknown position, a first image of a scene;

receiving a second image of the scene from a second imaging device, having a second, different FOV, and located at a second, initially unknown position, wherein the relative location and orientation between the imaging devices is unknown;

calibrating at least one of the first imaging device and second imaging device, to obtain an origin point in a plane of the first image, said origin point defining convergence of a plurality of epipolar lines, each representing an optical flow between the first image and the second image; and matching one or more pixels in the first image with one or more corresponding pixels in the second image by searching the one or more corresponding pixels along an epipolar line of the plurality of epipolar lines.

19. A system for image analysis, the system comprising:

a first imaging device, having a first FOV, and located at a first, initially unknown position;

a second imaging device, having a second, different FOV, and located at a second, initially unknown position, and wherein the relative location and orientation between the imaging devices is unknown;

a non-transitory memory device, wherein modules of instruction code are stored, and at least one processor associated with the memory device, and configured to execute the modules of instruction code, whereupon execution of said modules of instruction code, the at least one processor is configured to:

receive a first image of a scene from the first imaging device, and receive a second image of the scene from the second imaging device;

calculate a plurality of flow lines in the first image, wherein each flow line represents an optical flow between a pixel of the first image and a corresponding pixel of the second image; and calibrate at least one of the first imaging device and second imaging device, to obtain an origin point in a plane of the first image, said origin point defining convergence of a plurality of epipolar lines, each representing an optical flow between the first image and the second image; and match one or more pixels in the first image with one or more corresponding pixels in the second image by searching the one or more corresponding pixels along an epipolar line of the plurality of epipolar lines.

* * * * *